United States Patent
Li et al.

(10) Patent No.: US 11,356,977 B2
(45) Date of Patent: Jun. 7, 2022

(54) TRANSMISSION METHOD AND APPARATUS

(71) Applicant: HUAWEI TECHNOLOGIES CO., LTD., Guangdong (CN)

(72) Inventors: Chao Li, Beijing (CN); Xingwei Zhang, Beijing (CN); Jie Shi, Shenzhen (CN); Yinghua Sun, Shenzhen (CN); Zhe Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/521,335

(22) Filed: Jul. 24, 2019

(65) Prior Publication Data

US 2019/0349893 A1    Nov. 14, 2019

Related U.S. Application Data

(63) Continuation of application No. PCT/CN2018/073779, filed on Jan. 23, 2018.

(30) Foreign Application Priority Data

Jan. 24, 2017   (CN) .......................... 201710054817.0

(51) Int. Cl.
*H04W 72/00* (2009.01)
*H04W 56/00* (2009.01)
*H04W 72/04* (2009.01)

(52) U.S. Cl.
CPC ....... *H04W 72/005* (2013.01); *H04W 56/001* (2013.01); *H04W 72/0446* (2013.01)

(58) Field of Classification Search
None
See application file for complete search history.

(56) References Cited

U.S. PATENT DOCUMENTS

2011/0077038 A1   3/2011   Montojo et al.
2012/0320880 A1  12/2012   Han et al.
(Continued)

FOREIGN PATENT DOCUMENTS

CN    101179282 A    5/2008
CN    101272232 A    9/2008
(Continued)

OTHER PUBLICATIONS

Chen Fatang et al. Research on secondary synchronization signals in LTE systems and DSP implementation, Study on Optical Communications, Oct. 2010. pp. 64-67, with English abstract.

*Primary Examiner* — Ajit Patel
*Assistant Examiner* — Pamit Kaur
(74) *Attorney, Agent, or Firm* — Slater Matsil, LLP

(57) ABSTRACT

Embodiments of the present invention relate to the field of communications methods and technologies, and in particular, to a transmission method and apparatus. The transmission method includes: generating, by a first device, a sequence based on one or more transmission parameters, where the one or more transmission parameters include at least one of the following: a time domain resource type, transmission waveform indication information, subcarrier spacing indication information, device type information, service type indication information, multiple-input multiple-output MIMO parameter information, duplex mode indication information, control channel format indication information, and transmission carrier indication information; generating to-be-transmitted information by using the sequence; and sending the to-be-transmitted information. According to the transmission method and apparatus in the embodiments of the present invention, a new transmission error check mechanism is provided.

27 Claims, 10 Drawing Sheets

(56) References Cited

U.S. PATENT DOCUMENTS

| | | | |
|---|---|---|---|
| 2013/0003639 A1* | 1/2013 | Noh | H04W 72/0406 370/312 |
| 2013/0196674 A1 | 8/2013 | Ahmadi | |
| 2013/0279485 A1 | 10/2013 | Gao et al. | |
| 2014/0016556 A1 | 1/2014 | Shimezawa et al. | |
| 2014/0301359 A1* | 10/2014 | Seo | H04W 72/1289 370/330 |
| 2014/0321383 A1* | 10/2014 | Wu | H04W 72/042 370/329 |
| 2015/0365215 A1 | 12/2015 | Kim et al. | |
| 2016/0197659 A1 | 7/2016 | Yu et al. | |
| 2016/0366717 A1 | 12/2016 | Yang et al. | |
| 2017/0311301 A1* | 10/2017 | Yu | H04W 72/042 |
| 2018/0176065 A1* | 6/2018 | Deng | H04B 7/088 |
| 2019/0215119 A1* | 7/2019 | Kim | H04W 74/0833 |
| 2020/0396721 A1* | 12/2020 | Tang | H04W 72/046 |

FOREIGN PATENT DOCUMENTS

| | | |
|---|---|---|
| CN | 101997568 A | 3/2011 |
| CN | 102065054 A | 5/2011 |
| CN | 102415001 A | 4/2012 |
| CN | 103178883 A | 6/2013 |
| CN | 103840909 A | 6/2014 |
| CN | 103873109 A | 6/2014 |
| CN | 104168095 A | 11/2014 |
| CN | 104205691 A | 12/2014 |
| CN | 104853339 A | 8/2015 |
| CN | 105024778 A | 11/2015 |
| CN | 105187151 A | 12/2015 |
| CN | 105453456 A | 3/2016 |
| CN | 105453629 A | 3/2016 |
| CN | 105763294 A | 7/2016 |
| EP | 2988536 A1 | 2/2016 |
| JP | 2010525657 A | 7/2010 |
| JP | 2012039573 A | 2/2012 |
| JP | 2013225867 A | 10/2013 |
| KR | 20120140618 A | 12/2012 |
| KR | 20140081754 A | 7/2014 |
| RU | 2426254 C2 | 8/2011 |
| WO | 2013022244 A2 | 2/2013 |
| WO | 2015042004 A1 | 3/2015 |
| WO | WO-2015042004 A1 * | 3/2015 ........ H04W 28/0236 |
| WO | 2016006903 A1 | 1/2016 |
| WO | 2016013351 A1 | 1/2016 |
| WO | 2017196406 A1 | 11/2017 |

* cited by examiner

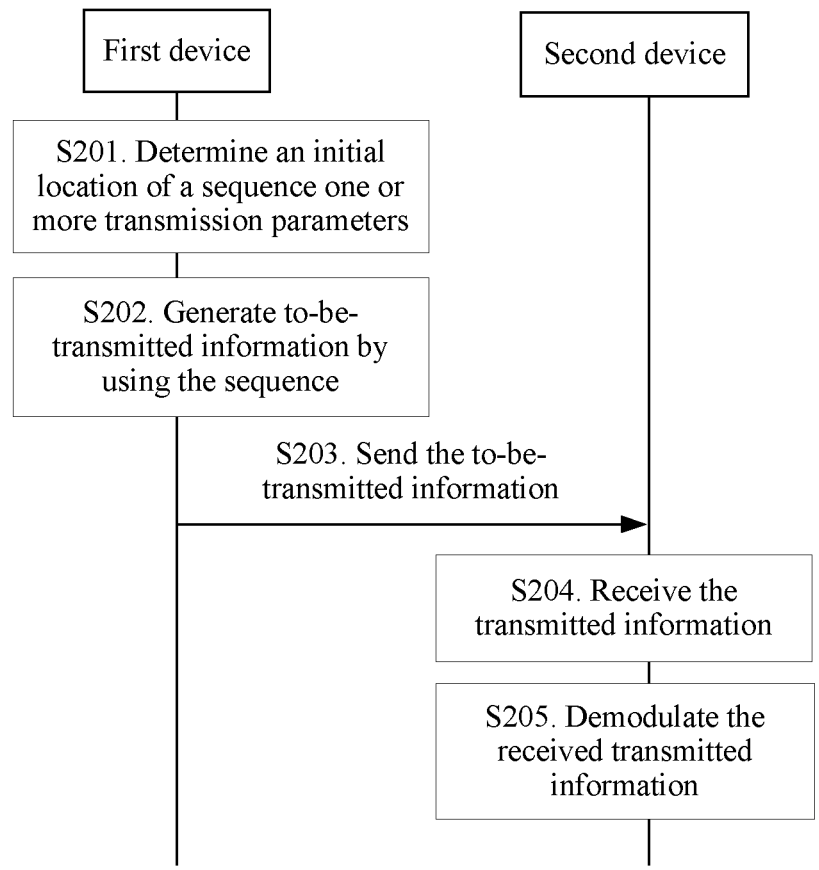
FIG. 4
| $n_{RNTI}$: 16 bits | q: 1bit | $n_s$: 4 bits | $N_{ID}^{cell}$: 9 bits |
FIG. 5
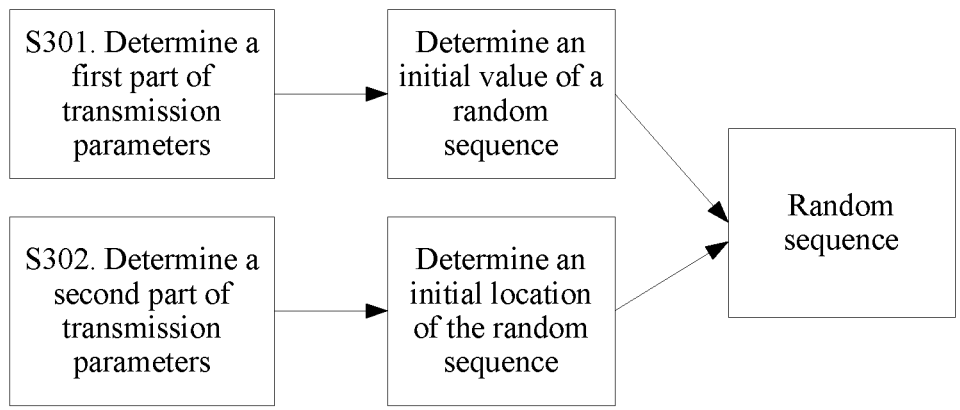
FIG. 6

TRANSMISSION METHOD AND APPARATUS

CROSS-REFERENCE TO RELATED APPLICATIONS

This application is a continuation of International Application No. PCT/CN2018/073779, filed on Jan. 23 2018, which claims priority to Chinese Patent Application No. 201710054817.0, filed on Jan. 24, 2017. The disclosures of the aforementioned applications are hereby incorporated by reference as if reproduced in their entireties.

TECHNICAL FIELD

Embodiments of the present invention relate to the field of communications methods and technologies, and in particular, to a transmission method and apparatus.

BACKGROUND

Data transmission reliability needs to be ensured in a signal transmission process. If errors always occur on data transmitted in a communications system, system performance or operability is very poor. However, in an actual communications system, for example, in a wireless communications system, errors frequently occur during data transmission due to channel randomicity and interference uncertainty. In particular, when an error occurs at a specific time of data transmission, errors may continuously occur on subsequent data. To enable a communications system to obtain stable and reliable transmission performance, when the communications system is designed, how to improve data transmission reliability can be considered from a plurality of aspects and a plurality of perspectives, to randomize interference at each time of transmission as much as possible. In particular, some key parameters cannot be erroneous when transmission is performed in the system. Once the key parameters are erroneous, unrecoverable errors occur during all subsequent demodulation.

For a 5G communications system currently studied by the 3GPP, the entire 5G system is more flexible and complex than an LTE system. In a transmission process, a large quantity of parameters used for data transmission need to be transmitted and detected between a transmitter and a receiver. Once some of the parameters are erroneous in a communication process, uncorrectable errors occur in an entire subsequent transmission process. However, a conventional channel coding/decoding mechanism can check whether an information bit is correct in a data transmission process, but cannot check a transmission parameter. Therefore, it is particularly important to further support a mechanism for flexibly checking a large quantity of transmission parameters in time.

SUMMARY

Embodiments of the present invention provide a transmission method and apparatus, to provide a new transmission error check mechanism.

According to a first aspect, an embodiment of the present invention provides a transmission method. The method includes: generating, by a first device, a sequence based on one or more transmission parameters, where the one or more transmission parameters include at least one of the following: a time domain resource type, transmission waveform indication information, subcarrier spacing indication information, device type information, service type indication information, multiple-input multiple-output (MIMO) parameter information, duplex mode indication information, control channel format indication information, and transmission carrier indication information; generating, by the first device, to-be-transmitted information by using the sequence; and sending, by the first device, the to-be-transmitted information.

In the solution of this embodiment of the present invention, the generating, by the first device, to-be-transmitted information by using the sequence includes: scrambling, by the first device, to-be-transmitted data by using the sequence, where the to-be-transmitted information is scrambled transmitted data; or generating, by the first device, a reference signal by using the sequence, where the to-be-transmitted information is a scrambling reference signal.

In the implementation of this embodiment of the present invention, the one or more transmission parameters are introduced into the sequence, and the to-be-transmitted information is generated by using the sequence, so that a receiver determines, based on whether the received information is correct, whether the received transmission parameters are correct. Therefore, the one or more transmission parameters can be checked.

Further, in the solution of this embodiment of the present invention, the sequence is generated by using the one or more transmission parameters, to scramble the data or generate the reference signal. After receiving the reference signal or the data scrambled by using the sequence, the receiver first performs descrambling. If a transmission parameter is erroneously estimated in a communication process, regardless of a value of an SNR of the current receiver, the receiver determines that a received data packet is erroneous, and the receiver checks in time whether a previously received transmission parameter is correct, instead of keeping trying or performing retransmission, thereby reducing unnecessary retransmission and power consumption, and reducing accumulation or propagation of data transmission errors.

In a possible embodiment, the generating, by a first device, a sequence based on the one or more transmission parameters includes: determining, by the first device, an initial value of the sequence and/or an initial location of the sequence based on at least one of the one or more transmission parameters, and generating the sequence based on the initial value of the sequence and/or the initial location of the sequence.

In the implementation of this embodiment of the present invention, the one or more transmission parameters are introduced into the initial value and/or the initial location of the sequence, and the receiver generates a sequence in the same manner, and verifies, by using the generated sequence, whether the transmitted information is correct, to check the one or more transmission parameters.

Further, in the solution of this embodiment of the present invention, the one or more transmission parameters are introduced into the initial value and/or the initial location of the sequence, so that more transmission parameters can be verified without an increase in a sequence length.

In a possible embodiment, the one or more transmission parameters further include a time domain resource index and/or a cell identifier.

In a possible embodiment, the time domain resource index is determined in any one of the following manners: determining the time domain resource index based on a positive integer indicated by signaling; determining the time domain resource index based on a system message period or a synchronization signal transmission interval; determining the time domain resource index based on a subcarrier spacing; and determining the time domain resource index based on a quantity of slots in a subcarrier spacing used within predefined duration.

In the implementation of this embodiment of the present invention, the first device may determine the initial value and/or the initial location of the sequence based on the time resource domain index, and may determine a new time domain resource index by redividing a time domain resource and renumbering time domain resources obtained after the redivision. Therefore, the sequence can be determined by using the new time domain resource index, to resolve a problem in generating scrambling sequences for slot parameters in different subcarrier spacings within a time-frequency resource of a preset length without a modification to the sequence.

In a possible embodiment, the determining, by the first device, an initial value of the sequence and/or an initial location of the sequence based on at least one of the one or more transmission parameters includes: generating, by the first device, the initial value of the sequence by using a first parameter in the one or more transmission parameters, and generating the initial location of the sequence by using a second parameter in the one or more transmission parameters, where the first parameter is different from the second parameter; or respectively determining the initial value of the sequence and the initial location of the sequence based on different bits of a same transmission parameter.

In the solution of this embodiment of the present invention, the transmission parameter used to determine the initial value of the sequence may be different from or the same as the transmission parameter used to determine the initial location of the sequence. When the initial value and the initial location of the sequence are determined by using a same transmission parameter, the initial value and the initial location of the sequence may be respectively determined by using different bits of the same transmission parameter. For example, all bits of the same transmission parameter are divided into two parts: One part is used to generate the initial value of the sequence, and the other part is used to determine the initial location of the sequence. Therefore, the transmission parameter can be verified with reference to the initial value of the sequence and the initial location of the sequence.

In a possible embodiment, the generating, by the first device, to-be-transmitted information by using the sequence includes: determining, by the first device based on a service type parameter of to-be-transmitted data and/or a capability type of a receiving device, the sequence used to generate the to-be-transmitted information; and generating, by the first device, the to-be-transmitted information by using the determined sequence.

In the solution of this embodiment of the present invention, a plurality of or a plurality of types of transmission parameters may be predefined, and each or each type of transmission parameter is corresponding to a different service type and/or a different capability type of the receiving device. When generating the to-be-transmitted information, the first device determines the to-be-used sequence based on the service type parameter of the to-be-transmitted data and/or the capability type of the receiving device, and generates the to-be-transmitted information by using the determined sequence.

In a possible embodiment, the generating, by a first device, a sequence based on one or more transmission parameters includes: generating, by the first device, a plurality of subsequences based on the one or more transmission parameters, where each subsequence is determined based on all or some of the one or more transmission parameters; and generating, by the first device, the sequence based on the plurality of subsequences, where a length of the sequence is a sum of lengths of the plurality of subsequences.

In the solution of this embodiment of the present invention, the sequence used to generate the to-be-transmitted information is generated based on the plurality of subsequences, and each subsequence is determined based on one or more of the foregoing transmission parameters, so that more transmission parameters and/or a longer transmission parameter can be introduced into a sequence.

In a possible embodiment, the generating, by a first device, a sequence based on one or more transmission parameters includes: generating, by the first device, a plurality of subsequences based on the one or more transmission parameters, where each subsequence is determined based on all or some of the one or more transmission parameters; and correspondingly the generating, by the first device, to-be-transmitted information by using the sequence includes: scrambling, by the first device, the to-be-transmitted data by using the plurality of subsequences, and/or generating a reference signal by using the plurality of subsequences; or the plurality of subsequences are respectively used on different time domain resources.

In the solution of this embodiment of the present invention, the first device generates the plurality of subsequences based on the one or more transmission parameters, and the first device can scramble the data by using the plurality of subsequences, and/or generate the reference signal by using the plurality of subsequences.

In a possible embodiment, the first device further scrambles data in control information (for example, information in a physical broadcast channel PBCH) sent together with a synchronization signal, for example, scrambles, by using a parameter related to a slot or symbol number, the control information sent together with the synchronization signal.

According to a second aspect, an embodiment of the present invention provides a transmission method. The method includes: determining, by a first device based on one or more transmission parameters, an initial location used to generate a sequence, where the one or more transmission parameters are not constants; generating, by the first device, to-be-transmitted information by using the sequence; and sending, by the first device, the to-be-transmitted information.

In the implementation of this embodiment of the present invention, the one or more transmission parameters are introduced into the initial location of the sequence, and the to-be-transmitted information is generated by using the sequence, so that more transmission parameters and/or a longer transmission parameter can be introduced into the sequence without a modification to a sequence length. A receiver determines, based on whether the received information is correct, whether the received transmission parameters are correct, so that the one or more transmission parameters can be checked.

In a possible embodiment, the one or more transmission parameters include at least one of the following: a time domain resource index, a time domain resource type, transmission waveform indication information, subcarrier spacing indication information, device type information, service type indication information, MIMO parameter information, duplex mode indication information, control channel format indication information, a cell identifier, and transmission carrier indication information.

In a possible embodiment, the method further includes: determining, by the first device, an initial value of the sequence based on the one or more transmission parameters.

In the implementation of this embodiment of the present invention, the one or more transmission parameters are introduced into the initial value and the initial location of the sequence, and the receiver generates a sequence in the same manner, and verifies, by using the generated sequence, whether the transmitted information is correct, to check the one or more transmission parameters.

Further, in the solution of this embodiment of the present invention, the one or more transmission parameters are introduced into the initial value and the initial location of the sequence, so that more transmission parameters can be verified.

In a possible embodiment, a transmission parameter used to determine the initial value of the sequence is different from a transmission parameter used to determine the initial location of the sequence; or the initial value of the sequence and the initial location of the sequence are respectively determined based on different bits of a same transmission parameter.

In the solution of this embodiment of the present invention, the transmission parameter used to determine the initial value of the sequence may be different from or the same as the transmission parameter used to determine the initial location of the sequence. When the initial value and the initial location of the sequence are determined by using a same transmission parameter, the initial value and the initial location of the sequence may be respectively determined by using different bits of the same transmission parameter. For example, all bits of the same transmission parameter are divided into two parts: One part is used to generate the initial value of the sequence, and the other part is used to determine the initial location of the sequence. Therefore, the transmission parameter can be verified with reference to the initial value of the sequence and the initial location of the sequence.

In a possible embodiment, the time domain resource index is determined based on a parameter M, where the parameter M is determined in any one of the following manners: the parameter M is a predefined positive integer; the parameter M is a positive integer that is indicated by signaling; the parameter M is determined based on a system message period or a synchronization signal transmission interval; the parameter M is determined based on a subcarrier spacing; or the parameter M is based on a quantity of slots in a subcarrier spacing used within predefined duration.

In the implementation of this embodiment of the present invention, the first device may determine the initial value and/or the initial location of the sequence based on the time domain index, and may determine a new time domain resource index by redividing a time domain resource and renumbering time domain resources obtained after the redivision. Therefore, the sequence can be determined by using the new time domain resource index, to resolve a problem in generating scrambling sequences for slot parameters in different subcarrier spacings within a time-frequency resource of a preset length without a modification to the sequence.

In a possible embodiment, the sequence is determined based on a plurality of subsequences, where each subsequence is determined based on all or some of the one or more transmission parameters, and a length of the sequence is a sum of lengths of the plurality of subsequences.

In the solution of this embodiment of the present invention, the sequence used to generate the to-be-transmitted information is generated based on the plurality of subsequences, and each subsequence is determined based on one or more of the foregoing transmission parameters, so that more transmission parameters and/or a longer transmission parameter can be introduced into a sequence.

In a possible embodiment, the sequence includes a plurality of subsequences, where each subsequence is determined based on all or some of the one or more transmission parameters; and correspondingly the generating, by the first device, to-be-transmitted information by using the sequence includes: scrambling, by the first device, to-be-transmitted data by using the plurality of subsequences, and/or generating a reference signal by using the plurality of subsequences; or the plurality of subsequences are respectively used on different time domain resources.

In the solution of this embodiment of the present invention, the first device generates the plurality of subsequences based on the one or more transmission parameters, and the first device can scramble the data by using the plurality of subsequences, and/or generate the reference signal by using the plurality of subsequences.

In a possible embodiment, the generating, by the first device, to-be-transmitted information by using the sequence includes: determining, by the first device based on a service type parameter of to-be-transmitted data and/or a capability type of a receiving device, the sequence used to generate the to-be-transmitted information; and generating, by the first device, the to-be-transmitted information by using the determined sequence.

In the solution of this embodiment of the present invention, a plurality of or a plurality of types of transmission parameters may be predefined, and each or each type of transmission parameter is corresponding to a different service type and/or a different capability type of the receiving device. When generating the to-be-transmitted information, the first device determines the to-be-used sequence based on the service type parameter of the to-be-transmitted data and/or the capability type of the receiving device, and generates the to-be-transmitted information by using the determined sequence.

According to a third aspect, an embodiment of the present invention provides a transmission method. The method includes: receiving, by a second device, information transmitted by a first device; and demodulating, by the second device, the received information by using a sequence, where the sequence is determined based on one or more transmission parameters, and the one or more transmission parameters include at least one of the following: a time domain resource type, transmission waveform indication information, subcarrier spacing indication information, device type information, service type indication information, multiple-input multiple-output MIMO parameter information, duplex mode indication information, control channel format indication information, and transmission carrier indication information.

In the implementation of this embodiment of the present invention, the one or more transmission parameters are introduced into the sequence, and the to-be-transmitted information is generated by using the sequence, so that a receiver (corresponding to the second device) determines, based on whether the received information is correct, whether the received transmission parameters are correct. Therefore, the one or more transmission parameters can be checked.

Further, in the solution of this embodiment of the present invention, the sequence is generated by using the one or more transmission parameters, to scramble data or generate a reference signal. After receiving the reference signal or the data scrambled by using the sequence, the receiver first performs descrambling. If a transmission parameter is erroneously estimated in a communication process, regardless of a value of an SNR of the current receiver, the receiver determines that a received data packet is erroneous, and the receiver checks in time whether a previously received transmission parameter is correct, instead of keeping trying or performing retransmission, thereby reducing unnecessary retransmission and power consumption, and reducing accumulation or propagation of data transmission errors.

In a possible embodiment, the method further includes: determining, by the second device, an initial value of the sequence and/or an initial location of the sequence based on at least one of the one or more transmission parameters, and generating the sequence based on the initial value of the sequence and/or the initial location of the sequence.

In a possible embodiment, the one or more transmission parameters further include a time domain resource index and/or a cell identifier.

In a possible embodiment, the time domain resource index is determined in any one of the following manners: determining the time domain resource index based on a positive integer indicated by signaling; determining the time domain resource index based on a system message period or a synchronization signal transmission interval; determining the time domain resource index based on a subcarrier spacing; and determining the time domain resource index based on a quantity of slots in a subcarrier spacing used within predefined duration.

In a possible embodiment, the determining, by the second device, an initial value of the sequence and/or an initial location of the sequence based on at least one of the one or more transmission parameters includes: generating, by the second device, the initial value of the sequence by using a first parameter in the one or more transmission parameters, and generating the initial location of the sequence by using a second parameter in the one or more transmission parameters, where the first parameter is different from the second parameter; or respectively determining the initial value of the sequence and the initial location of the sequence based on different bits of a same transmission parameter.

In a possible embodiment, the demodulating, by the second device, the received information by using a sequence includes: determining, by the second device based on a service type parameter of transmitted data and/or a capability type of a receiving device, the sequence used to demodulate the received information; and demodulating, by the second device, the received information by using the determined sequence.

In a possible embodiment, that the sequence is determined based on one or more transmission parameters includes that the sequence is determined based on a plurality of subsequences, where each subsequence is determined based on all or some of the one or more transmission parameters, and a length of the sequence is a sum of lengths of the plurality of subsequences.

In a possible embodiment, that the sequence is determined based on one or more transmission parameters includes that the sequence includes a plurality of subsequences, where each subsequence is determined based on all or some of the one or more transmission parameters; and correspondingly the demodulating, by the second device, the received information by using a sequence includes: demodulating, by the second device, the received information by using the plurality of subsequences; or the plurality of subsequences are respectively used on different time domain resources.

According to a fourth aspect, an embodiment of the present invention provides a transmission method. The method includes: receiving, by a second device, information transmitted by a first device; and demodulating, by the second device, the received information by using a sequence, where an initial location of the sequence is determined based on one or more transmission parameters, and the one or more transmission parameters are not a constants.

In the implementation of this embodiment of the present invention, the one or more transmission parameters are introduced into the initial location of the sequence, and the to-be-transmitted information is generated by using the sequence, so that more transmission parameters and/or a longer transmission parameter can be introduced into the sequence without a modification to a sequence length. A receiver (corresponding to the second device) determines, based on whether the received information is correct, whether the received transmission parameters are correct, so that the one or more transmission parameters can be checked.

In a possible embodiment, the one or more transmission parameters include at least one of the following: a time domain resource index, a time domain resource type, transmission waveform indication information, subcarrier spacing indication information, device type information, service type indication information, MIMO parameter information, duplex mode indication information, control channel format indication information, a cell identifier, and transmission carrier indication information.

In a possible embodiment, the initial location of the sequence is determined based on the one or more transmission parameters.

In a possible embodiment, a transmission parameter used to determine the initial value of the sequence is different from a transmission parameter used to determine the initial location of the sequence; or the initial value of the sequence and the initial location of the sequence are respectively determined based on different bits of a same transmission parameter.

In a possible embodiment, the time domain resource index is determined based on a parameter M, where the parameter M is determined in any one of the following manners: the parameter M is a predefined positive integer; the parameter M is indicated by signaling; the parameter M is determined based on a system message period or a synchronization signal transmission interval; the parameter M is determined based on a subcarrier spacing; or the parameter M is determined based on a quantity of slots in a subcarrier spacing used within predefined duration.

In a possible embodiment, the sequence is determined based on a plurality of subsequences, where each subsequence is determined based on all or some of the one or more transmission parameters, and a length of the sequence is a sum of lengths of the plurality of subsequences.

In a possible embodiment, the sequence includes a plurality of subsequences, where each subsequence is determined based on all or some of the one or more transmission parameters; and correspondingly the demodulating, by the second device, the received information by using a sequence includes: demodulating, by the second device, the received information by using the plurality of subsequences; or the plurality of subsequences are respectively used on different time domain resources.

In a possible embodiment, the demodulating, by the second device, the received information by using a sequence includes: determining, by the second device based on a service type parameter of transmitted data and/or a capability type of a receiving device, the sequence used to demodulate the received information; and demodulating the received information by using the determined sequence.

According to a fifth aspect, to implement the transmission method in the first aspect, an embodiment of the present invention provides a transmission apparatus. The transmission apparatus has a function of implementing actions of the first device in the transmission method. The function may be implemented by hardware, or may be implemented by hardware by executing corresponding software. The hardware or the software includes one or more modules corresponding to the function.

In a possible embodiment, the apparatus includes: a sequence generation module, configured to generate a sequence based on one or more transmission parameters, where the one or more transmission parameters include at least one of the following: a time domain resource type, transmission waveform indication information, subcarrier spacing indication information, device type information, service type indication information, multiple-input multiple-output MIMO parameter information, duplex mode indication information, control channel format indication information, and transmission carrier indication information; a transmit information generation module, configured to generate to-be-transmitted information by using the sequence; and a sending module, configured to send the to-be-transmitted information.

In the solution of this embodiment of the present invention, the sequence generation module, the transmit information generation module, and the sending module are further configured to perform possible steps in the related embodiments in the embodiment in the first aspect. For specific content, refer to the embodiment in the first aspect.

In another possible embodiment, the apparatus includes a processor and a transceiver. The processor is configured to implement functions of the sequence generation module and the transmit information generation module, and the transceiver is configured to implement a function of the sending module.

According to a sixth aspect, to implement the transmission method in the second aspect, an embodiment of the present invention provides a transmission apparatus. The transmission apparatus has a function of implementing actions of the first device in the transmission method. The function may be implemented by hardware, or may be implemented by hardware by executing corresponding software. The hardware or the software includes one or more modules corresponding to the function.

In a possible embodiment, the transmission apparatus includes: a first generation module, configured to determine, based on one or more transmission parameters, an initial location used to generate a sequence, where the one or more transmission parameters are not constants; a second generation module, configured to generate to-be-transmitted information by using the sequence; and a sending module, configured to send the to-be-transmitted information.

In the solution of this embodiment of the present invention, the first generation module, the second generation module, and the sending module are further configured to perform possible steps in the related embodiments in the embodiment in the second aspect. For specific content, refer to the embodiment in the second aspect.

In another possible embodiment, the apparatus includes a processor and a transceiver. The processor is configured to implement functions of the first generation module and the second generation module, and the transceiver is configured to implement a function of the sending module.

According to a seventh aspect, to implement the transmission method in the third aspect, an embodiment of the present invention provides a transmission apparatus. The transmission apparatus has a function of implementing actions of the second device in the transmission method. The function may be implemented by hardware, or may be implemented by hardware by executing corresponding software. The hardware or the software includes one or more modules corresponding to the function.

In a possible embodiment, the apparatus includes: a receiving module, configured to receive information transmitted by a first device; and a demodulation processing module, configured to demodulate the received information by using a sequence, where the sequence is determined based on one or more transmission parameters, and the one or more transmission parameters include at least one of the following: a time domain resource type, transmission waveform indication information, subcarrier spacing indication information, device type information, service type indication information, multiple-input multiple-output MIMO parameter information, duplex mode indication information, control channel format indication information, and transmission carrier indication information.

In the solution of this embodiment of the present invention, the receiving module and the demodulation processing module are further configured to perform possible steps in the related embodiments in the embodiment in the third aspect. For specific content, refer to the embodiment in the third aspect.

In another possible embodiment, the apparatus includes a processor and a transceiver. The processor is configured to implement a function of the demodulation processing module, and the transceiver is configured to implement a function of the receiving module.

According to an eighth aspect, to implement the transmission method in the fourth aspect, an embodiment of the present invention provides a transmission apparatus. The transmission apparatus has a function of implementing actions of the second device in the transmission method. The function may be implemented by hardware, or may be implemented by hardware by executing corresponding software. The hardware or the software includes one or more modules corresponding to the function.

In a possible embodiment, the transmission apparatus includes: a receiving module, configured to receive information transmitted by a first device; and a processing module, configured to demodulate the received information by using a sequence, where an initial location of the sequence is determined based on one or more transmission parameters, and the one or more transmission parameters are not constants.

In the solution of this embodiment of the present invention, the receiving module and the processing module are further configured to perform possible steps in the related embodiments in the embodiment in the fourth aspect. For specific content, refer to the embodiment in the fourth aspect.

In another possible embodiment, the apparatus includes a processor and a transceiver. The processor is configured to implement a function of the processing module, and the transceiver is configured to implement a function of the receiving module.

According to a ninth aspect, an embodiment of the present invention provides a computer storage medium, configured to store computer software instructions used by the foregoing transmission apparatuses, and the computer storage medium includes programs used to perform the transmission methods corresponding to the transmission apparatuses.

In the transmission solutions in the embodiments of the present invention, a new transmission error check mechanism is provided, so that a transmission parameter can be checked.

BRIEF DESCRIPTION OF DRAWINGS

FIG. 4 is a flowchart of a transmission method according to another embodiment of this application;

FIG. 5 is a schematic diagram of occupied bits of a scrambling sequence in the prior art;

FIG. 6 is a flowchart of a method for determining a sequence used in a transmission method according to an embodiment of this application;

DESCRIPTION OF EMBODIMENTS

Figure 1:
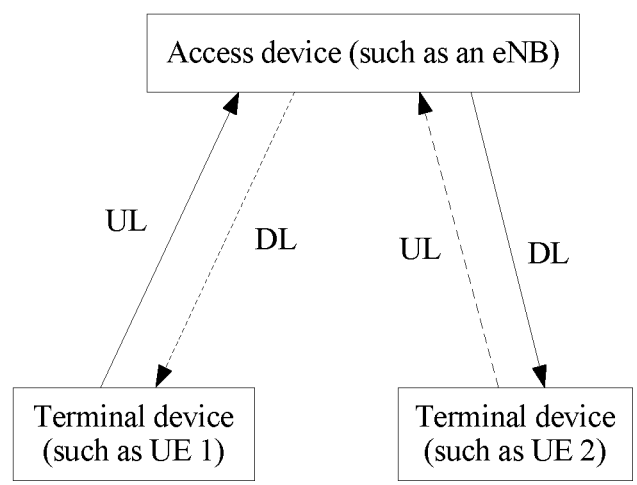
FIG. 1 is a schematic diagram of a possible application scenario according to this application.

FIG. 1 is a schematic diagram of a possible application scenario according to this application. As shown in FIG. 1, terminal devices (such as UE 1 and UE 2) are connected to an access device (such as an eNB), and data communication between the terminal devices needs forwarding performed by the access device. A radio link on which the terminal device sends data to the access device is referred to as an uplink (uplink, UL), and a radio link on which the access device sends data to the terminal device is referred to as a downlink (downlink, DL).

Figure 2:
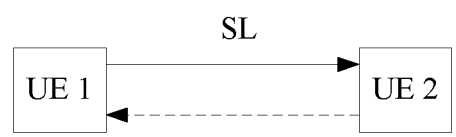
FIG. 2 is a schematic diagram of another possible application scenario according to this application.

FIG. 2 is a schematic diagram of another possible application scenario according to this application. As shown in FIG. 2, the scenario includes a plurality of terminal devices, and data transmission and information exchange are performed between the plurality of terminal devices (for example, UE 1 and UE 2) by using a device-to-device (device-to-device, D2D) direct communication technology. In the scenario shown in FIG. 2, a link on which direct data communication is performed between the terminal devices is referred to as a direct link or a sidelink (sidelink, SL). During D2D communication, two devices that communicate with each other may be any transmission nodes or terminal devices of a same type. This is not limited in the embodiments of the present invention.

The terminal device involved in the embodiments of the present invention may include various handheld devices, in-vehicle devices, wearable devices, or computing devices with a wireless communication function, or other processing devices connected to a wireless modem, and include user equipment (user equipment, UE), a mobile station (mobile station, MS), a terminal (terminal), a terminal device (terminal device), and the like that are in various forms. The access device involved in the present invention may be a base station. The base station is an apparatus deployed in a radio access network to provide a wireless communication function for UE. The base station may include a macro base station, a micro base station, a relay station, an access point, and the like that are in various forms. A device with a function of a base station may have different names in systems that use different radio access technologies. For example, the device with a function of a base station is referred to as an evolved NodeB (evolved NodeB, eNB or eNodeB) in an LTE network, is referred to as a NodeB (NodeB) in a 3rd Generation 3G network, or is referred to as a next generation NodeB or a Gbit NodeB, gNB for short, in a 5G network. For ease of description, in this application, the foregoing apparatuses that provide the wireless communication function for the UE are collectively referred to as a base station or a BS.

Based on the scenarios shown in FIG. 1 and FIG. 2, the embodiments of the present invention provide a transmission method. The transmission method in the embodiments of the present invention may be applied to the communication scenario that is shown in FIG. 1 and in which forwarding performed by the access device is needed, and may also be applied to the direct communication scenario shown in FIG. 2. From another perspective, the transmission method in the embodiments of the present invention may be applied to uplink communication processes in the scenarios shown in FIG. 1 and FIG. 2, and may also be applied to downlink communication processes in the communication scenarios shown in FIG. 1 and FIG. 2. For ease of description, in a communication process, a device used as a transmit end is referred to as a first device, and a device used as a receive end is referred to as a second device.

In communication processes of systems shown in FIG. 1 and FIG. 2, to improve an anti-interference capability of the systems, transmission information is scrambled. For example, transmission data is scrambled by using a sequence, or a reference signal is generated by using a sequence. The transmission information is sent after the transmission information is scrambled. In the prior art, a sequence used to scramble the transmission information is a predefined known sequence, and a communication method in the prior art lacks a transmission parameter check mechanism. If a transmission parameter check procedure is independently set, communication complexity is increased.

To check a transmission parameter, in the transmission method in, the embodiments of the present invention, a sequence used to scramble transmission information is determined based on the transmission parameter. After receiving the information, a receiver first generates a corresponding sequence based on the transmission parameter, and then performs descrambling or receiving detection by using the sequence. If the transmission parameter is erroneously estimated in a communication process, regardless of a value of a signal-to-noise ratio (signal-to-noise ratio, SNR) of the current receiver, the receiver determines that a received data packet is erroneous. When a received SNR is relatively high and a decoding error occurs, the receiver checks in time whether a received transmission parameter used to scramble data (or modified to-be-transmitted information) is correct, instead of keeping trying or performing retransmission, thereby reducing unnecessary retransmission and power consumption, and reducing accumulation or propagation of data transmission errors. Further, in the method in the embodiments of the present invention, a large quantity of transmission parameters can be simultaneously checked, to improve system flexibility and robustness.

In an implementation solution of the present invention, a sequence is generated in the following manner: determining an initial value of the sequence based on at least one transmission parameter; generating a sequence $c_1(n)$ based on the initial value of the sequence and a corresponding generator polynomial; determining an initial location of the sequence based on the at least one transmission parameter; and extracting a sequence with a length of to-be-scrambled data or a to-be-transmitted reference signal from the sequence $c_1(n)$, where the extraction starts from the initial location of the sequence, in other words, obtaining a first sequence $c(n)$ in the embodiments of the present invention. In the embodiments of the present invention, the initial value of the sequence is an initial parameter used to generate the sequence. For example, for a sequence generated by using a shift register, for example, an m-sequence or a Gold sequence, an initial value of the sequence is an initialized value of a shift register for generating one or more subsequences of the sequence.

In the embodiments of the present invention, the initial location of the sequence is a start location for reading the sequence. The following provides a further description with reference to an instance. For example, a sequence $c_1(n)$ is generated based on an initial value for generating a sequence, where $0 \le n \le L-1$. Herein, L is a length of the sequence $c_1(n)$, and a value of L is usually greater than a length of a to-be-used sequence. For example, for a Gold sequence with a length of 31 bits, a value of L is $(2^{31}-1)$, while a length of an actual to-be-used sequence is usually not greater than 10,000. Therefore, how to extract a to-be-used sequence c from a very long original sequence $c_1(n)$ needs to be determined. For example, a to-be-used sequence can be defined as $c(n)=c_1(n+a)$, where $0 \le n \le M-1$, and M is a length of the to-be-used sequence. The constant a herein is the initial location that is for generating a sequence and that is mentioned in the present invention.

In the solution of the embodiments of the present invention, generating a sequence based on a transmission parameter may include at least one of the following cases.

(1) Generate a sequence for determining information to be transmitted according to at least one transmission parameter. Specifically, the generated sequence may be one sequence, or may be a plurality of subsequences.

For example, for the case of the generated sequence is one sequence, generate an initial value of a first sequence according to a transmission parameter A, where an initial location of the first sequence is a constant; and determine a the first sequence based on the initial value of the first sequence and the initial location of the first sequence.

For the case of a plurality of subsequences are generated, a method for generating each subsequence is the same as the foregoing method for generating the first sequence, but a transmission parameter used to generate each subsequence may be different from the transmission parameter used to generate the first sequence. Optionally, after the plurality of subsequences are generated, to-be-transmitted information may be determined based on the plurality of subsequences. Optionally, one sequence may be generated based on the plurality of subsequences, where a length of the generated sequence is a sum of lengths of the plurality of subsequences; and the to-be-transmitted information is determined by using the generated sequence.

(2) A target sequence is generated based on at least one transmission parameter. The generated target sequence is associated with an initial value of a final to-be-used sequence. A length of the target sequence is greater than a length of the sequence that to be used, or the target sequence is a cyclic sequence. In the solution of the embodiments of the present invention, the final to-be-used sequence is extracted from the target sequence, and an initial extraction location is corresponding to an initial location of the final to-be-used sequence. In the solution of the embodiments of the present invention, the final to-be-used sequence extracted from the target sequence may be one sequence, or may be a plurality of subsequences. Optionally, when a plurality of subsequences are extracted, to-be-transmitted information may be determined based on the plurality of subsequences. Optionally, one sequence may be generated based on the plurality of extracted subsequences, where a length of the generated sequence is a sum of lengths of the plurality of subsequences; and the to-be-transmitted information is determined by using the generated sequence.

In the embodiments of the present invention, the initial value of the to-be-used sequence and/or the initial location of the to-be-used sequence are/is determined based on the transmission parameter, and an optional transmission parameter includes but is not limited to one or more of the following.

(1) Uplink/Downlink Indication Information

The uplink/downlink indication information is used to indicate whether current transmission is uplink transmission or downlink transmission. For example, 1 bit is used to indicate the uplink/downlink information. For example, 1 indicates downlink, and 0 indicates uplink. Optionally, the uplink/downlink indication information may be used in a scenario in which a same waveform is used for uplink transmission and downlink transmission, for example, an OFDM waveform is used for both uplink transmission and downlink transmission; or may be used in a scenario in which different waveforms are used for uplink transmission and downlink transmission, for example, an OFDM waveform is used for downlink transmission and a non-OFDM waveform is used for uplink transmission.

When the transmission parameter used for generating the sequence is the uplink/downlink indication information, it can be checked whether a detected current link is an uplink or a downlink, particularly in a TDD system in which an uplink and a downlink are on one carrier. Therefore, it can be found in time whether the parameter is correctly detected in a previous step.

(2) Information about a Waveform Used During Transmission

The information about a waveform used during transmission is used to indicate a specific waveform used during transmission. The waveform includes an OFDM waveform or an SC-FDM waveform. Herein, 1 bit may be used to indicate the information about a waveform used during transmission. For example, 1 indicates the OFDM waveform used during transmission, and 0 indicates the SC-FDM waveform used during transmission.

Alternatively, in another optional manner, the waveform information includes a multi-carrier waveform and a single-carrier waveform. Likewise, 1 bit may be used to indicate the information about a waveform used during transmission. For example, 1 indicates the OFDM waveform used during transmission, and 0 indicates the single carrier waveform used during transmission.

When the transmission parameter used for generating the sequence is the information about a waveform used during transmission, information about a waveform used for a current link can be detected. For example, both OFDM and SC-FDM can be used on an uplink. If a waveform detected by the receiver is erroneously determined, errors continuously occur during subsequent demodulation. Therefore, it can be found in time whether the parameter is correctly detected in a previous step.

(3) MIMO Parameter Information

MIMO mode indication information indicates a MIMO mode used during current transmission. The MIMO mode may be a spatial multiplexing mode or a beamforming mode. Alternatively, the MIMO mode may be a spatial multiplexing mode or a diversity mode. For example, 1 bit is used to indicate the MIMO mode indication information, where 1 indicates spatial multiplexing, and 0 indicates transmit diversity. Optionally, multiplexing may be single-stream multiplexing, or may be multi-stream multiplexing.

Optionally, the MIMO parameter information may be used to indicate a beam type or a beam identifier. The beam type may be an analog beam or a beam generated based on a codebook or a code word. Alternatively, the beam type may be a dynamic beam, or a static or semi-static beam. The dynamic beam can relatively quickly change with time and frequency, and therefore beam scanning and tracking on a time or frequency resource can be implemented. The identifier for indicating a beam is a number or an index for indicating a beam sent or received by a current device.

When the transmission parameter used for generating the sequence is the MIMO parameter information, a MIMO parameter or mode of a current link can be detected. In particular, in a high frequency, an identifier of a currently detected beam can be further confirmed. If the identifier of the detected beam is inconsistent with an identifier of a beam in actual communication, although it does not cause errors during communication, a received SNR greatly decreases, affecting communication quality. Therefore, whether the parameter is correctly detected in a previous step can be found in time by checking the parameter.

(4) Device Type Information

The device type information may be device types obtained through classification based on different costs, device types obtained through classification based on different device capabilities, or device types obtained through classification based on different functions. For example, the device types obtained through classification based on costs include a low-cost device and a high-cost device. These types are usually used for a transmission terminal in the Internet of Things. For example, the device types obtained through classification based on device capabilities include a low-capability device, a medium-capability device, and a high-capability device. Alternatively, the device types obtained through classification based on device capabilities are directly obtained through classification based on device capability levels (for example, the capability levels may be 1 to 10). For example, the device types obtained through classification based on different functions include a base station device, a relay device, and a terminal device. Alternatively, the device types obtained through classification based on different functions may be devices defined based on different access functions, for example, a device in the Internet of Things, a mobile broadband service device, and a low-latency and ultra-reliable device.

When the transmission parameter used for generating the sequence is the device type information, a type of a service accessed by a current device can be detected. For example, if a current transmission device is a low-capability terminal in the Internet of Things and the parameter is erroneously detected, subsequent transmission parameters cannot match the parameter, and consequently subsequent detection errors continuously occur. Therefore, it can be found in time whether the parameter is correctly detected in a previous step.

(5) Service Type Indication Information

The service type indication information is used to indicate a service type. Service types include a mobile broadband service, a low-latency service, an ultra-reliable service, a low-latency and ultra-reliable service, a service in the Internet of Things, and other types. Alternatively, the service types can be indicated by using different values of different service quality parameters.

When the transmission parameter used for generating the sequence is the service type indication information, a type of a service accessed by a current device can be detected. For example, if a currently transmitted service is a low-latency and ultra-reliable service, once the parameter is erroneously detected, subsequent service layer data cannot match the parameter, and consequently upper-layer data detection errors occur. Therefore, it can be found in time whether the parameter is correctly detected in a previous step.

(6) Transmission Carrier Indication Information

The transmission carrier index indication information includes a current transmission carrier type or a current transmission carrier identifier. The transmission carrier type may be a primary/secondary carrier type, for example, a primary carrier or a secondary carrier. The transmission carrier type may be a control plane type, for example, a control carrier or a data carrier. The transmission carrier type may be a scheduling type: a scheduling-based carrier or a scheduling-free carrier. Alternatively, a transmission carrier may be a licensed carrier or an unlicensed carrier.

When the transmission parameter used for generating the sequence is the transmission carrier indication information, the following case can be avoided: An error occurs when the current carrier type is detected, and therefore a different type of carrier is erroneously used. Therefore, it can be found in time whether the parameter is correctly detected in a previous step.

(7) Duplex Mode Indication Information

The duplex mode indication information is used to indicate a duplex mode of a current transmission carrier. For example, the duplex mode indication information includes at least two of TDD, FDD, and FD (a full-duplex mode).

When the transmission parameter used for generating the sequence is the duplex mode indication information, a duplex type of the current carrier can be detected, to avoid an error in determining the duplex type. Therefore, it can be found in time whether the parameter is correctly detected in a previous step.

(8) Different Control Channel or Control Information Formats

The control channel or control information formats are used to indicate transmission modes of data scheduled by using corresponding control information, for example, different MIMO modes, different service types, or different transmission link types.

Alternatively, the control channel or control information formats are used to indicate different control channel formats or types. For example, the formats or types include a long control channel or a short control channel. For example, 1 bit is used to indicate the format or type, where 1 indicates a long control channel (for example, a control channel with more time domain symbols such as four symbols, one slot, or one subframe length during transmission), and 0 indicates a short control channel (for example, a control channel with fewer time domain symbols such as one or two symbols during transmission). For another example, the formats or types include a control channel that is based on one-step scheduling or a control channel that is based on two-step scheduling.

When the transmission parameter used for generating the sequence is the control information, it can be detected whether a control channel mode is erroneously detected. Once the parameter is erroneously detected, corresponding control information is also erroneously detected. Consequently, the receiver performs more unnecessary blind detection. Therefore, it can be found in time whether the parameter is correctly detected in a previous step, to reduce blind detection.

(9) Indication Information of Different Subcarrier Spacings

The indication information of different subcarrier spacings is used to indicate values or types of subcarrier spacings used during current transmission. For example, the indicated subcarrier spacings are at least two of the following subcarrier spacing values: {15, 30, 60, 120, 240, 480} kHz.

When the transmission parameter used for generating the sequence is the indication information of different subcarrier spacings, it can be detected whether a subcarrier spacing parameter is erroneously detected. Once the parameter is erroneously detected, errors occur during subsequent transmission and detection, because a subcarrier spacing is a most key parameter during transmission in a multi-carrier system. Once the parameter is erroneously detected, the receiver continuously performs control and data decoding detection. This increases implementation complexity of the entire receiver.

(10) Time Domain Resource Type

The time domain resource type includes a normal time domain resource and a short time domain resource. For example, the time domain resource type may include a slot (slot) and a mini-slot (mini-slot). A length of the mini-slot is usually not greater than that of the slot.

Optionally, the time domain resource type includes indication information of single-resource transmission and indication information of multi-resource aggregation transmission. The single-resource transmission means that during one time of transmission, one most basic transmission resource element is used, for example, one slot and one carrier; or a single frequency domain resource is used as a unit for transmission. The multi-resource aggregation transmission means that a plurality of transmission resources are simultaneously used during one time of transmission. For example, during one time of transmission, a plurality of slots are used for aggregation transmission, a plurality of carriers are used for aggregation transmission, or a plurality of basic frequency domain resource elements are used for aggregation transmission. Herein, 1 bit may be used to indicate whether current transmission is the single-resource transmission or the multi-resource aggregation transmission. Alternatively, a plurality of bits may be used to indicate a quantity of currently-aggregated transmission resources.

When the transmission parameter used for generating the sequence is the time domain resource type, it can be detected whether a current time domain resource type is erroneously detected. Once the parameter is erroneously detected, fewer or more data symbols are read when a time domain resource is subsequently read, causing an error during subsequent communication. Therefore, it can be found in time whether the parameter is correctly detected in a previous step, to reduce a quantity of blind detection times and a quantity of decoding times.

(11) Cell Identifier Information

A cell identifier is a physical identifier used to identify a current cell in which UE is located.

(13) Time Domain Resource Index Information

The time domain resource index information is indication information of a time domain resource in a specific subcarrier spacing, for example, may be an index of the time domain resource.

Figure 3:
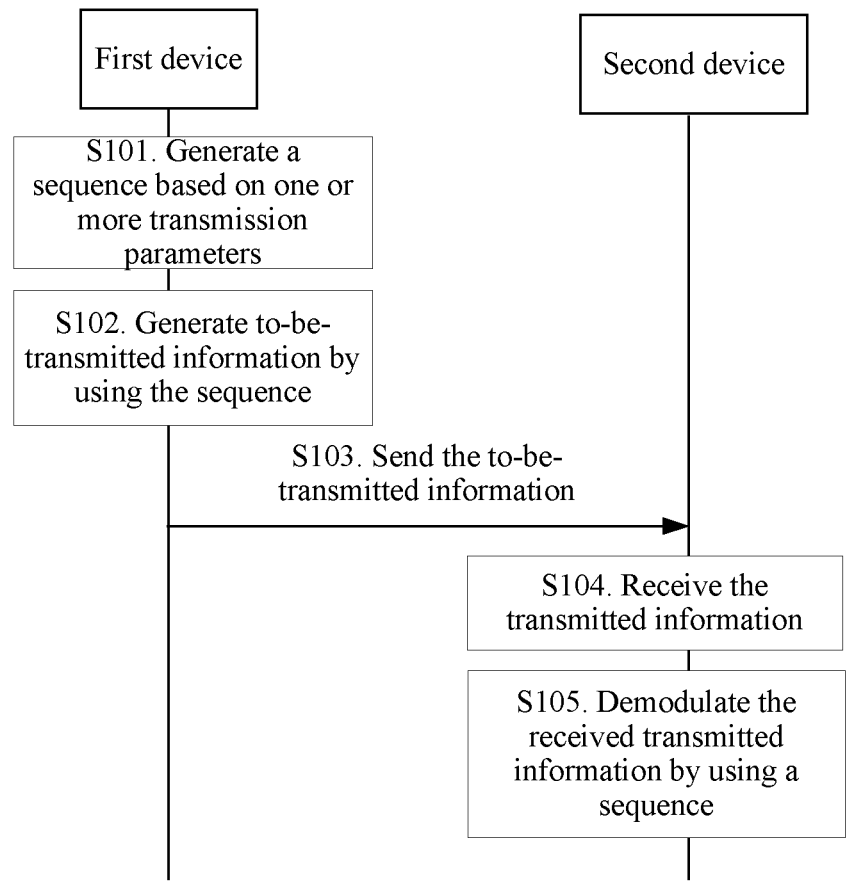
FIG. 3 is a flowchart of a transmission method according to an embodiment of this application.

In the solution of the embodiments of the present invention, the sequence may be generated by using any one or more of the foregoing transmission parameters. The sequence is generated by using the foregoing transmission parameters, so that bidirectional check can be performed on the foregoing transmission parameters. In addition, interference randomization can be performed in different scenarios corresponding to the foregoing transmission parameters, to avoid non-differentiable or continuous interference generated in the different scenarios. When the sequence is generated by using more than one transmission parameter, bidirectional check can be simultaneously performed on a plurality of parameters, to further improve system stability and reliability. The following specifically describes the transmission method in this application with reference to specific embodiments. FIG. 3 is a flowchart of a transmission method according to an embodiment of this application. As shown in FIG. 3, the method includes the following steps.

Step S101: A first device generates a sequence based on one or more transmission parameters.

In the solution of this embodiment of the present invention, the first device may generate the sequence in at least one of the foregoing two manners. In both the foregoing two manners, when generating the sequence, the first device needs to determine an initial value and/or an initial location of the sequence based on the one or more transmission parameters.

In the solution of this embodiment of the present invention, for the one or more transmission parameters used to determine the initial value and/or the initial location of the sequence, refer to the foregoing descriptions.

In the solution of this embodiment of the present invention, that the first device determines the initial value of the sequence and/or the initial location of the sequence based on the one or more transmission parameters includes the following:

The first device determines the initial value of the sequence based on the one or more transmission parameters, where the initial location of the sequence is a constant. For example, in a solution of generating the sequence by using the transmission parameters, the initial location of the sequence is a constant. For another example, in a solution of generating a target sequence based on the one or more transmission parameters and extracting a to-be-used sequence from the target sequence, an initial extraction location (corresponding to the initial location of the sequence) of the sequence may be set to a constant.

In another possible embodiment, the first device further determines the initial location of the sequence based on the one or more transmission parameters. For example, in a solution of generating a target sequence based on the one or more transmission parameters and extracting a to-be-used sequence from the target sequence, the first device further determines an initial extraction location (corresponding to the initial location of the sequence) of the sequence based on the one or more transmission parameters.

Optionally, the first device may generate the initial value of the sequence by using a first parameter in the one or more transmission parameters, and generate the initial location of the sequence by using a second parameter in the one or more transmission parameters.

It should be noted that the first parameter may be the same as or may be different from the second parameter. In a specific example, when the first parameter is the same as the second parameter, the initial value of the sequence and the initial location of the sequence may be separately determined based on different bits of a same transmission parameter. When the initial value of the sequence and the initial location of the sequence are separately determined based on the different bits of the same transmission parameter, the transmission parameter may be any one of the foregoing listed transmission parameters. In a specific example, the transmission parameter may be user identity indication information, for example, a radio network temporary identifier (Radio Network Temporary Identifier, RNTI). For another example, the transmission parameter may be a cell identifier. In a specific example, the transmission parameter is a cell identifier. If the cell identifier has a maximum of 10 bits (in other words, the cell identifier has a total of 1024 different values), the initial value of the sequence may be determined based on first 5 bits of the transmission parameter, and the initial location of the sequence may be determined based on last 5 bits of the transmission parameter. A specific bit selection manner may be determined based on an actual application requirement.

Step S102: The first device generates to-be-transmitted information by using the sequence.

In the solution of this embodiment of the present invention, that the first device generates to-be-transmitted information by using the sequence includes:

scrambling to-be-transmitted data by using the sequence, where the to-be-transmitted information is scrambled to-be-transmitted data; or generating a reference signal by using the sequence, where the to-be-transmitted information is a scrambling reference signal.

Optionally, for the case of the first device generates one sequence, the first device scrambles the data by using the sequence, or generates the reference signal by using the sequence.

For the case of the first device generates a plurality of subsequences, after generating one sequence based on the plurality of subsequences, the first device may scramble the data by using the sequence, or generate the reference signal by using the sequence. In another possible embodiment, when the first device generates a plurality of subsequences, the first device may scramble the to-be-transmitted data by using the plurality of subsequences, or generate the reference signal by using the plurality of subsequences.

In another possible embodiment, when the first device generates a plurality of subsequences, the plurality of subsequences are separately corresponding to different time domain resources or transmission systems. The first device selects a sequence from the plurality of subsequences based on a current time domain resource or transmission system type; and scrambles the data by using the selected sequence, or generates the reference signal by using the selected sequence.

Step S103: The first device sends the to-be-transmitted information.

In the solution of this embodiment of the present invention, after the first device sends the to-be-transmitted information, a receiving device receives the to-be-transmitted information. The receiving device may be a terminal device in a direct communication manner, or may be a base station in a base station forwarding manner.

Step S104: A second device receives the information transmitted by the first device.

Step S105: The second device demodulates the received transmitted information by using a sequence.

The sequence used by the second device is also determined based on the one or more transmission parameters. For a manner of determining the sequence by the second device based on the one or more transmission parameters, refer to the manner of determining the sequence by the first device, and details are not described herein again.

In the solution of this embodiment of the present invention, that the second device demodulates the received transmitted information includes that the second device demodulates transmitted data by using the sequence, and/or the second device performs receiving processing by using a received reference signal. The performing receiving processing by using a received reference signal includes: demodulating the received data by using the reference signal; or estimating channel state information by using the reference signal, and/or demodulating the data by using the reference signal.

In summary, it can be seen that in the solution of this embodiment of the present invention, the sequence is generated by using the one or more transmission parameters, for example, a transmission parameter newly introduced into a system and/or a transmission parameter with increased length; and the data is scrambled by using the generated sequence, and/or the reference signal is generated by using the generated sequence. The second device (corresponding to a receiver) also generates a reference signal before the receiving processing, and then performs descrambling in a corresponding step.

If the second device erroneously estimates a transmission parameter in a process of communicating with the first device, regardless of a value of an SNR of the second device, the second device determines that a received data packet is erroneous, and the second device checks in time whether a previously obtained transmission parameter is correct, to avoid accumulation or propagation of data transmission errors. FIG. 4 is a flowchart of a transmission method according to another embodiment of this application. In the method in this embodiment of the present invention, at least an initial location of a sequence is determined based on one or more transmission parameters. As shown in FIG. 4, the method includes the following steps:

Step S201: A first device determines, based on one or more transmission parameters, an initial location for generating a sequence, where the one or more transmission parameters are not constants. The one or more transmission parameters that are not constants may be one or more of the foregoing listed transmission parameters, and details are not described again.

In a possible embodiment, an initial value of the sequence to be used by the first device is a constant. For example, the first device determines a known sequence as a target sequence, and the first device determine an initial extraction location (corresponding to the initial location) from the target sequence based on the one or more transmission parameters.

In another possible embodiment, the first device further determines an initial value of the sequence based on the one or more transmission parameters. For example, the first device determines the target sequence based on the one or more transmission parameters.

Step S202: The first device generates to-be-transmitted information by using the sequence.

A method for generating the to-be-transmitted information by using the sequence in this embodiment of the present invention is the same as that in the embodiment shown in FIG. 3, and details are not described again.

Step S203: The first device sends the to-be-transmitted information.

In the solution of this embodiment of the present invention, after the first device sends the to-be-transmitted information, a receiving device receives the transmitted information. The receiving device may be a terminal device in a direct communication manner, or may be a base station in forwarding manner.

Step S204: A second device receives the information transmitted by the first device.

Step S205: The second device demodulates the received information by using a sequence.

The sequence used by the second device is also determined based on the one or more transmission parameters. For a manner of determining the sequence by the second device based on the one or more transmission parameters, refer to the manner of determining the sequence by the first device, and details are not described herein again.

In the solution of this embodiment of the present invention, the second device demodulates transmitted data by using the sequence, and/or the second device performs receiving processing by using a received reference signal. The performing receiving processing by using received reference information includes: demodulating the received data by using the reference signal, or estimating channel state information by using the reference signal. A main difference between the transmission method in the embodiments of the present invention and the transmission method in the prior art lies in that in the solutions of this application, the one or more transmission parameters are introduced into the sequence used to scramble the data or used to generate the reference signal. With reference to the methods shown in FIG. 3 and FIG. 4, a process of determining the sequence based on the one or more transmission parameters is mainly described in detail in the following embodiments, and a process of scrambling the data based on the generated sequence or generating the reference signal based on the generated sequence is described in some embodiments. In the following embodiments, an example in which a random sequence is determined based on one or more transmission parameters is used for description.

In a specific embodiment of the transmission method in this application, when generating a random sequence, a first device determines an initial location of the random sequence based on one or more of the foregoing transmission parameters. For example, a random sequence generated in the prior art is fixed at 31 bits, and an output initial location is a constant value, for example, 1600. When the random sequence is generated by using the transmission method in this embodiment of the present invention, the random sequence may still be determined according to an existing method, or the random sequence may be determined based on one or more of the foregoing transmission parameters. Regardless of a manner used to generate the random sequence, the initial location of the random sequence is determined based on one or more transmission parameters.

The following further describes a random sequence generation process in the transmission method in this embodiment of the present invention with reference to a specific example in a Long Term Evolution (Long Term Evolution, LTE) system.

In the LTE system, a random sequence with a length of 31 bits is defined as:

$c(n)=(x_1(n+N_C)+x_2(n+N_C))\bmod 2$, where $c(n)$ is an output value of the random sequence, and $x_1$ and $x_2$ are generated by using the following generator polynomials:

$x_1(n+31)=(x_1(n+3)+x_1(n))\bmod 2$ $x_2(n+31)=(x_2(n+3)+x_2(n+2)+x_2(n+1)+x_2(n))\bmod 2$.

An initial sequence value corresponding to $x_1$ is $x_1(0)=1$, $x_1(n)=0, n=1, 2, \ldots, 30$. An initial value corresponding to the random sequence $c(n)$ is an initial value of $x_2$, namely, $c_{init}=\Sigma_{i=0}^{30} x_2(i) \cdot 2^i$. In some practical specific applications, an initial value $c_{init}$ of a sequence is usually given, and then after the initial value is converted into a binary numeral, an initial value of each status bit in an $x_2$ sequence shift register is determined.

In some specific application instances, for example, an initial value generated for a physical uplink shared channel (Physical Uplink Shared Channel, PUSCH) data scrambling sequence is:

$c_{init}=n_{RNTI} \cdot 2^{14} \pm q \cdot 2^{13} + \lfloor n_s/2 \rfloor \cdot 2^9 + N_{ID}^{cell}$.

As shown in FIG. 5, $n_{RNTI}$ is a value of a radio network temporary identifier (Radio Network Temporary Identity, RNTI) and is indicated by using 16 bits; q is a quantity of code words, there are two code words in LTE, q is indicated by 1 bit, and a value of q is 0 or 1; $n_s$ is a slot number, and a value of $n_s$ ranges from 0 to 9 in LTE and is indicated by using 4 bits; and $N_{ID}^{cell}$ is a cell identifier, and a value of $N_{ID}^{cell}$ ranges from 0 to 503 in LTE.

It may be learned from FIG. 5 that 30 bits in a sequence with a length of 31 bits are occupied. If a new parameter needs to be randomized, the sequence cannot be expanded or a new parameter cannot be added in an existing LTE technology; or when a length of bits occupied by one or more of existing parameters increases, an existing sequence cannot be used any more due to a bit length limitation.

To expand a sequence or add a new transmission parameter to a sequence, in an embodiment of the present invention, during sequence generation, for a specific sequence (which may be a reused existing sequence or a newly defined sequence), an initial value and an initial location of the sequence may be determined by using the following method. As shown in FIG. 6, the method includes the following steps.

Step S301: Determine a first part of transmission parameters, where the first part of transmission parameters is used to determine an initial value of a sequence. For example, the initial value of the random sequence is still determined according to the formula $c_{init}=n_{RNTI} \cdot 2^{14} + q \cdot 2^{13} + \lfloor n_s/2 \rfloor \cdot 2^9 + N_{ID}^{cell}$. In this case, the first part of transmission parameters includes an RNTI, q, $n_s$, and a cell ID.

Step S302: Determine a second part of transmission parameters, where the second part of transmission parameters is used to determine an initial location of the random sequence. One or more of the foregoing listed transmission parameters may be selected as the second part of transmission parameters. When a transmission parameter is selected, some bits of the transmission parameter may be used. Correspondingly, the initial location of the random sequence is:

$$N_c=f(x), N_c=f(x,y), N_c=f(x,y,z), \text{ where}$$

$f(\ )$ represents a function of transmission parameters x, y, and z.

In some optional specific embodiments, Nc may be any one of the following:

$$N_c=a+x,$$

$$N_c=a+x+y$$

$$N_c=a+a\cdot x$$

$$N_c=a+a\cdot(x+y)$$

$$N_c=a+a\cdot x+b\cdot y$$

$$N_c=\text{mod}(f(x),L)-M_{PN}$$

$$N_c=\text{mod}(f(x,y),L)-M_{PN}, \text{ where}$$

a and b are predefined real constants, L is a length of the random sequence, $M_{PN}$ is a read length of the random sequence, and mod(x, y) represents a modulo operation performed on a transmission parameter y based on a transmission parameter x.

Optionally, $n_s$ is used as an example, and Nc may be any one of the following specific examples:

$$N_c=1600+n_s,$$

$$N_c=1600(1+n),$$

$$N_c=1600+\lfloor n_s/2^m \rfloor,$$

$$N_c=1600(1+\lfloor n_s/2^m \rfloor),$$

$$N_c=1600+\text{mod}(n_s,M),$$

$$N_c=1600(1+\text{mod}(n_s,M)), \text{ where}$$

m is an integer. Apparently, $n_s$ may be changed to another transmission parameter.

Correspondingly, an output value of the random sequence is $$c(n)=(x_1(n+N_c)+x_2(n+N_c))\text{mod } 2.$$

Optionally, the second part of transmission parameters may be the same as or different from the first part of transmission parameters. For example, the second part of transmission parameters may be a time domain resource type, transmission waveform indication information, subcarrier spacing indication information, beam indication information, device type information, service type indication information, MIMO mode indication information, duplex mode indication information, and control channel format indication information. The first part of transmission parameters may be at least one of a UE identifier and a cell identifier.

Optionally, the second part of transmission parameters may be some bits of a transmission parameter in the first part of transmission parameters. For example, time domain resource indication information is divided into subframe index indication information and slot index indication information. In a specific example, the first part of transmission parameters includes a subframe number or a frame number, and the second part of transmission parameters includes a number of a slot in a specific subframe. For another example, the first part of transmission parameters includes a number of a slot in a specific subframe, and the second part of transmission parameters includes a subframe number or a frame number. For another example, bits of a cell identifier may be divided into two parts. One part is corresponding to the first transmission parameter, and the other part is corresponding to the second transmission parameter.

According to the transmission method in this embodiment, when determining the random sequence, two dimensions: the initial value and the initial location of the random sequence, need to be determined based on the transmission parameters. Therefore, in comparison with an existing method for defining the random sequence, more sequences can be randomized without forcibly requiring modification to the random sequence. This increases a dimension of randomization, so that a newly introduced transmission parameter or a parameter obtained after an original parameter becomes greater can be further randomized, to ensure that more transmission parameters are randomized. In another specific embodiment of the transmission method in this application, the first device determines the initial value and the initial location of the random sequence based on a time domain resource index. In the method in this embodiment of the present invention, the time domain resource index may be a time domain resource index value defined in an existing system. Optionally, the time domain resource index is a time domain resource index that is redefined after continuous time domain resources are divided based on a smaller time granularity, and the redefined time domain resource index is a generation parameter of the random sequence. After the continuous time domain resources are divided into different parts based on the smaller time granularity, generation parameters of the random sequence in a smaller time domain resource are different, and generation parameters of the random sequence in smaller time domain resources may be the same or may be different.

In this embodiment of the present invention, a slot is a set of occupied transmission resources corresponding to one or more consecutive time domain symbols. A length of the time domain resources occupied by the slot is usually not greater than 1 ms.

Figure 7:
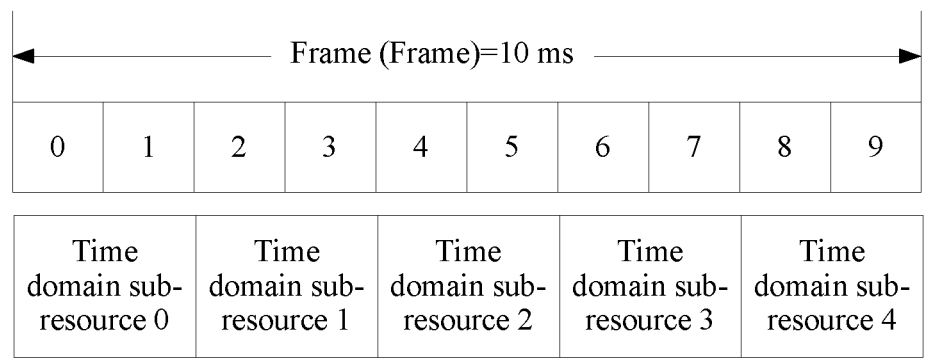
FIG. 7 is a schematic diagram of re-division of time domain resources according to an embodiment of this application.

FIG. 7 is a schematic diagram of redivided time domain resources. As shown in FIG. 7, a frame with a length of 10 ms (millisecond) includes 10 subframes, and each subframe has a length of 1 ms. The 10-ms frame may be divided into five time domain sub-resources. Generation parameters of a random sequence in different symbols or slots within a time domain sub-resource are different. Generation parameters of the random sequence in different time domain sub-resources may be the same or different. For example, generation parameters of a random sequence of time domain sub-resource 0 and time domain sub-resource 1 are the same. For another example, the 10-ms frame may be divided into 10 time domain sub-resources with a same length, and each time domain sub-resource is one subframe with a length of 1 ms. Generation parameters of the random sequence in different symbols or slots within a time domain sub-resource are different. Generation parameters of a sequence in different time domain sub-resources, for example, in symbols or slots at a same location in a first subframe and a second subframe, may be the same or different.

The solution of this embodiment of the present invention is applicable to a scenario of randomizing a time domain resource. For example, for a normal cyclic prefix (cyclic prefix, CP), if each slot occupies seven symbols, quantities of slots (slot) in different subcarrier spacings are shown in Table 1.

TABLE 1

Quantities of slots per ms in different subcarrier spacings

| | Subcarrier spacing (kHz) | | | | | |
|---|---|---|---|---|---|---|
| | 15 | 30 | 60 | 120 | 240 | 480 |
| Quantity of slots per ms | 2 | 4 | 8 | 16 | 32 | 64 |

Figure 8:
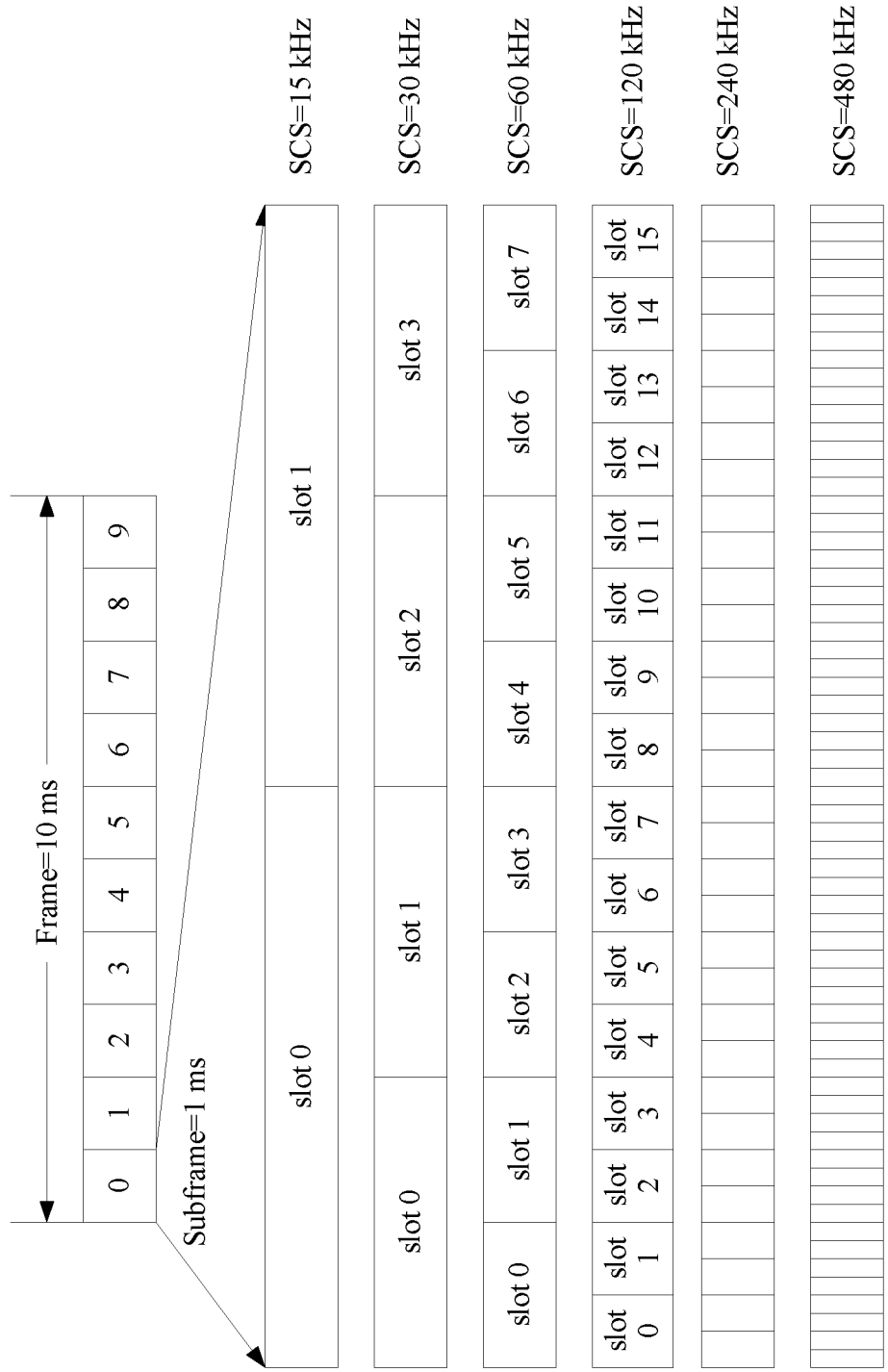
FIG. 8 is a schematic diagram of quantities of slots in different subcarrier spacings.

The quantities that are of slots (slot) in different subcarrier spacings and that are shown in Table 1 may alternatively be indicated in a manner of FIG. 8.

For another example, for a normal CP, if each slot occupies 14 symbols, quantities of slots in different subcarrier spacings are shown in Table 2.

TABLE 2

Quantities of slots per ms in different subcarrier spacings

| | Subcarrier spacing (kHz) | | | | | |
|---|---|---|---|---|---|---|
| | 15 | 30 | 60 | 120 | 240 | 480 |
| Quantity of slots per ms | 1 | 2 | 4 | 8 | 16 | 32 |

A further method in this embodiment is: replacing, with $f(n_s, M)$, a slot number $n_s$ for generating a random sequence, where $f(n_s, M)$ represents a function generated based on the slot number $n_s$ and a parameter M, in other words, a function determined based on $n_s$ and M.

For example, $f(n_s, M)=\mathrm{mod}(n_s, M)$ represents a modulo operation performed on the parameter M based on the slot number $n_s$.

For another example, for $f(n_s, M)$, k bits are extracted from a binary integer indicated by the slot $n_s$, where k is not greater than $\mathrm{ceil}(\log_2(M))$. For example, when M=20, ceil$(\log_2(M))$=5. A current slot $n_s$ is written as a binary numeral, and 5 bits are extracted from the binary numeral. For example, if the current $n_s$ is 56, the current $n_s$ is written as a binary numeral: 0111000. Herein, 5 bits may be extracted from the binary numeral. For example, if the 5 bits are extracted from right to left, in other words, less significant bits are extracted, a current slot number used to generate the sequence is 11000=24. For another example, if the 5 bits are extracted from left to right, in other words, more significant bits are extracted, a current slot number used to generate the sequence is 01110=14.

Herein, M represents M consecutive slots, and a value of M may be determined in any one of the following manners:

(1) M is a predefined fixed positive integer, for example, 20, 16, or 32.

(2) M is equal to a synchronization signal period corresponding to each subcarrier spacing. For example, M is a quantity of slots in the synchronization signal period. For another example, M is a half of a quantity of slots in the synchronization signal period.

(3) M is determined based on a predefined k bits occupied by $n_s$, for example, M=2 k.

(4) M is a quantity of slots in a different subcarrier spacing within predefined duration. For example, within 1 ms, a quantity of slots in a different subcarrier spacing is M=K*M0, and M0 is a quantity of slots in a reference subcarrier spacing. For example, if the reference subcarrier spacing is 15 kHz, M0=2 or 1. Herein, K is a multiple between a current subcarrier spacing and the reference subcarrier spacing. For example, if the current subcarrier spacing is 120 kHz, and the reference subcarrier spacing is 15 kHz, K=120/15=8, and correspondingly M=16 in this case.

In the solution of this embodiment of the present invention, M slots in a specific subcarrier spacing within a frame are used as a smaller time domain sub-resource, and a random sequence is generated in M slots within each time domain sub-resource based on $f(n_s, M)$.

It should be noted that different M slots in different subcarrier spacings occupy different durations. This is different from the prior art. For example, when M=16, M in a subcarrier spacing of 15 kHz is corresponding to 8 ms, M in a subcarrier spacing of 30 kHz is corresponding to 4 ms, and M in a subcarrier spacing of 60 kHz is corresponding to 2 ms.

In the solution of this embodiment of the present invention, a problem of how to generate scrambling sequences for slot parameters in different subcarrier spacings within a time-frequency resource of a preset length (for example, a 10-ms frame) is resolved. Therefore, a problem of how to generate a scrambling sequence by using a larger value of $n_s$ is resolved without a modification to the sequence. After this sub embodiment is implemented, scrambling on adjacent different time domain sub-resources is also different. In other words, within a 10-ms frame, scrambled sequences in different slots may be the same or different. In a solution of another embodiment of the transmission method in this application, the first device may separately generate a plurality of sequences based on different transmission parameters or based on different bits of a same transmission parameter, and then scramble data or generate a reference signal by separately or jointly using the plurality of sequences.

In the solution of this embodiment of the present invention, an optional method is: performing two-step numbering on a slot, and then separately generating different sequences based on different slot numbers.

For example, each time domain sub-resource is numbered by using $\mathrm{fix}(n_s/M)$, where $\mathrm{fix}(x)$ represents a rounding down operation performed on a number x. For example, fix(15.2)=15, and fix(16.7)=16. A value of M is the same as the foregoing defined value. Numbers of slots within a time domain sub-resource that includes M consecutive slots are the same, and numbers of slots within different time domain sub-resources are different. When a random sequence is generated, two numbers are generated:

$$n_{s1}=fix(n_s/M);\text{ and}$$

$$n_{s2}=\mathrm{mod}(n_s,M).$$

Figure 9:
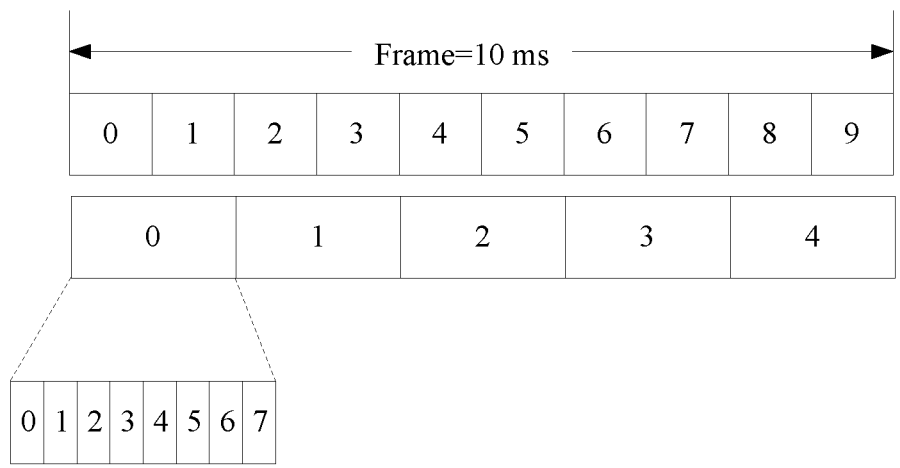
FIG. 9 is a schematic diagram of re-division and numbering time domain resources according to an embodiment of this application.

For example, when M=8, and a subcarrier spacing is 30 kHz, a number of a time domain resource within a 10-ms frame and numbers of slots within the time domain resource are shown in Table 3 and FIG. 9.

TABLE 3

Number of a time domain resource within a 10-ms frame in 30 kHz and numbers of slots within the time domain resource

| Slot index | 0 1 2 3<br>4 5 6 7 | 8 9 10 11<br>12 13 14 15 | 16 17 18 19<br>20 21 22 23 | 24 25 26 27<br>28 29 30 31 | 32 33 34 35<br>36 37 38 39 |
|---|---|---|---|---|---|
| Number $n_{s2}$ of a time domain sub-resource | 0 | 1 | 2 | 3 | 4 |
| Numbers $n_{s1}$ within a time domain sub-resource | 0 1 2 3<br>4 5 6 7 | 0 1 2 3<br>4 5 6 7 | 0 1 2 3<br>4 5 6 7 | 0 1 2 3<br>4 5 6 7 | 0 1 2 3<br>4 5 6 7 |

In the solution of this embodiment of the present invention, optionally, slot parameters obtained after two-step numbering may be randomized by using two sequences. The two sequences may be the same or may be different. The two sequences are respectively as follows:

$$c_{1,init}=f(n_{s1}); \text{ and}$$

$$c_{2,init}=f(n_{s2}), \text{ where}$$

ƒ(x) represents a function of x, in other words, initial values of the two sequences are determined based on the input variable x.

For example, if duration occupied by each time domain subunit is 1 ms, a time domain sub-resource number is a subframe number (nsubframe), namely, $n_{s1}=\text{fix}(n_s/M)=$ nsubframe.

If the PUSCH scrambling mentioned above is used as an example, an initial value of a first sequence is:

$$c_{1,init}=n_{RNTI} \cdot 2^{14}+q \cdot 2^{13}+n_{subframe} \cdot 2^9+N_{ID}^{cell}; \text{ and}$$

an initial value of a second sequence is:

$$c_{2,init}=n_s 2=(n_s/M)$$

$$M=K^*M_0$$

Herein, K and M0 are positive integers.

In the solution of this embodiment of the present invention, another optional method is: separately generating different sequences by using different transmission parameters, and then randomizing data or generating a reference signal by using these generated sequences.

For example, an initial value and/or an initial location $c_{1,init}$ of a first sequence are/is generated by using at least one of the following parameters:

a time domain resource index, a time domain resource type, transmission waveform indication information, subcarrier spacing indication information, beam indication information, and a UE identifier.

For example, an initial value and/or an initial location $c_{1,init}$ of a first sequence are/is generated by using at least one of the following parameters:

a cell identifier, device type information, service type indication information, MIMO mode indication information, duplex mode indication information, control channel format indication information, and carrier indication information.

Then, the first sequences $c_1(n)$ and $c_2(n)$ are separately obtained, and are separately used to scramble data and generate a reference signal in at least one of the following manners.

It is assumed that to-be-scrambled data is d(n). Then, output scrambled data b(n) is generated in the following manner:

$$b(n)=(d(n)+c_1(n)+c_2(n)) \bmod 2.$$

If a reference signal is generated by using a random sequence, a second sequence may be used in the following two manners:

Manner 1: Generate a first reference signal and a second reference signal respectively by using the first sequence and the second sequence, and then generate a target reference signal based on the first reference signal and the second reference signal.

For example, first, two reference signal sequences $r_1(m)$ and $r_2(m)$ are separately generated:

$$r_1(m) = \frac{1}{\sqrt{2}}(1 - 2 \cdot c_1(2m)) + j\frac{1}{\sqrt{2}}(1 - 2 \cdot c_1(2m+1))$$

$$r_2(m) = \frac{1}{\sqrt{2}}(1 - 2 \cdot c_2(2m)) + j\frac{1}{\sqrt{2}}(1 - 2 \cdot c_2(2m+1)),$$

m represents an identifier of each chip for generating a reference signal.

Then, a target reference signal sequence is generated:

$$r(m)=r_1(m) \cdot r_2(m)$$

or $$r(m)=r_1(m) \cdot r_2^*(m), \text{ where}$$

$r_2^*(m)$ represents a complex conjugate number of $r_2(m)$.

Manner 2: Generate a target reference signal sequence by jointly using the first sequence and the second sequence, and generate a target reference signal by using the target reference signal sequence.

For example, a target reference signal sequence r(m) is generated by jointly using the first sequence and the second sequence:

$$r(m) = \frac{1}{\sqrt{2}}(1 - 2 \cdot c(2m)) + j\frac{1}{\sqrt{2}}(1 - 2 \cdot c(2m+1))$$

$$c(2m) = (c_1(2m) + c_2(2m)) \bmod 2$$

$$c(2m) = (c_1(2m+1) + c_2(2m+1)) \bmod 2,$$

x mod 2 represents a modulo operation performed on 2 based on x, and has a same meaning as the foregoing mod(x, 2) but has a different expression manner from the foregoing mod(x, 2).

This embodiment has the following beneficial effects: A problem of how to perform transmission check on more transmission parameters is resolved. According to the method in this embodiment, more parameters can be transmitted, without forcibly grouping different time domain resources within a 10-ms frame. This can ensure that transmission parameters in different subframes within 10 ms are different.

Optionally, more than two sequences can be generated by using transmission parameters. Use these sequences to scramble data or generate a reference signal. Used methods are the same as those for two sequences, and therefore are not listed herein again. A solution of determining an initial value and an initial location of a random sequence based on a time domain resource index is the solution provided in FIG. 7 to FIG. 9 and the related descriptions, to be specific, a time domain resource index is redefined after continuous time domain resources are divided based on a smaller time granularity, and the redefined time domain resource index is used as a generation parameter for determining the random sequence.

In another solution of determining an initial value and an initial location of a random sequence based on a time domain resource index, a symbol in a slot may be used as a mini-slot (mini-slot), and numbers are further assigned to mini-slots (mini-slot) in one or more slots, and the sequence is generated based on the numbers. A specific method for further assigning numbers to mini-slots (mini-slot) in one or more slots and generating a sequence based on the numbers for transmission includes the following steps.

(1) Determine a first time domain resource index, where a time domain resource corresponding to the first time domain resource index is in a time domain resource corresponding to a second time domain resource index, and a subcarrier transmission spacing corresponding to the first time domain resource index is different from a subcarrier spacing corresponding to the second time domain resource index.

Figure 10:
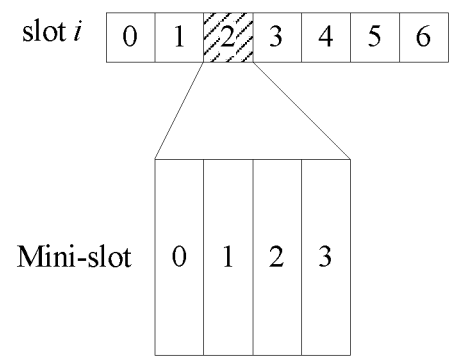
FIG. 10 is a schematic diagram of numbering a slot resource according to an embodiment of this application.

In a specific example, as shown in FIG. 10, slot i (slot i) is the second time domain resource index, a time domain resource corresponding to symbol 2 in the slot i is a mini-slot (mini-slot), and the mini-slot includes four symbols numbered 0 to 3. Optionally, the mini-slot can occupy one or more symbols in the slot i, but does not occupy more than all symbols in the slot i. The mini-slot is the first time domain resource.

(2) Generate the sequence based on the first time domain resource index.

(3) Scramble to-be-transmitted data by using the sequence, and/or generate a reference signal by using the sequence.

Further, optionally, a subcarrier spacing of the slot i is smaller than a subcarrier spacing of the mini-slot. For example, the subcarrier spacing of the slot i is 15 kHz, and the subcarrier spacing of the mini-slot is 30 kHz or 60 kHz. As shown in FIG. 10, when the subcarrier spacing of the slot i is 15 kHz, if the subcarrier spacing of the mini-slot is 60 kHz, one symbol 2 in the slot i may be corresponding to four symbols in the mini-slot. According to a time-frequency relationship in an OFDM system, a larger subcarrier spacing indicates shorter duration occupied by each symbol.

In this embodiment, because one slot i has time domain transmission resources in different subcarrier spacings, a generation parameter of a sequence that is used to scramble data used in a mini-slot and/or generate a reference signal, in particular, a parameter of a time domain resource index needs to be determined. In other words, when the data in the mini-slot and/or the reference signal are/is generated, an identifier of the mini-slot needs to be determined, and identifiers of different symbols in the mini-slot further need to be determined. If these parameters are not determined, parameter confusion occurs when the corresponding sequence is generated. This affects bidirectional check on a corresponding transmission parameter, and therefore affects communication performance and system stability.

Optionally, the first time domain resource index is determined in at least one of the following manners:

Manner 1: Determine the first time domain resource index based on a slot index of the second time domain resource index occupied by the first time domain resource index. In a specific example, as shown in FIG. 10, a time domain resource index of the mini-slot is indicated by using a time domain resource index i of the slot 1.

Manner 2: Determine the first time domain resource index based on a symbol index of the second time domain resource index occupied by the first time domain resource index. In a specific example, as shown in FIG. 10, a time domain resource index of the mini-slot is indicated by using a number 2 of the symbol in the slot i.

Manner 3: Determine the first time domain resource index based on slot type indication information of the first time domain resource index. In a specific example, the slot type indication information may indicate a symbol length of the mini-slot or a subcarrier spacing of the mini-slot.

Manner 4: Determine the first time domain resource index based on an index of each symbol in the slot of the first time domain resource index. In a specific example, an index of the mini-slot may be generated by using an index of a specific time domain symbol in the mini-slot. In a solution of this embodiment of the present invention, data in control information (for example, information in a physical broadcast channel PBCH) sent together with a synchronization signal may further be scrambled by using a parameter related to a slot or symbol number.

For example, any one of the following implementations may be used:

$$c_{init}=N_{ID}^{cell}+n_s$$

$$c_{init}=N_{ID}^{cell}+\lfloor n_s/2^m \rfloor$$

$$c_{init}=N_{ID}^{cell}+n_s+1$$

In the solution of this embodiment of the present invention, the data in the control information sent together with the synchronization signal is scrambled to implement bidirectional check on synchronization detection. Optionally, a slot index and a symbol index may be jointly used for the data in the control information and a reference signal used when the control information is transmitted. In other words, both the slot index and the symbol index may separately or simultaneously appear during generation of a reference signal sequence, and may also appear during generation of a data scrambling sequence.

A time domain resource related to a subcarrier spacing is scrambled. A time domain resource within predefined duration (for example, one radio frame) is divided into M time domain sub-resources. Two concatenated sequences are used to scramble data on each time domain sub-resource and generate a reference signal on each time domain sub-resource. In addition, control information sent together with a synchronization signal is scrambled by using a parameter related to a slot or symbol index, to implement bidirectional check. In a possible example of this application, a new random sequence with a length greater than 31 bits can be defined, so that an extended slot length and more transmission parameters that need to be used to generate the random sequence can be input into the random sequence. A manner of defining a new random sequence with a length greater than 31 bits includes one or a combination of the following manners:

(1) A single random sequence with a length greater than 31 bits is used. The used random sequence is not limited to a Gold sequence, and may alternatively be another random sequence such as an m-sequence, a Gold-like sequence, or a Kasami sequence.

(2) A new random sequence is determined based on a plurality of subsequences.

In a possible embodiment, a new random sequence is generated according to a formula $c(n)=c_1(n \bmod N_1) \cdot c_2(n \bmod N_2), 0 \leq n \leq N_1 \cdot N_2 - 1$, where $c_1$ is a subsequence, $N_1$ is a length of the subsequence $c_1$, $c_2$ is another subsequence, $N_2$ is a length of the subsequence $c_2$, and a length of a sequence c is N1*N2.

Optionally, $c_1$ and $c_2$ each can use a Gold sequence with a length of 31 bits; or one of $c_1$ and $c_2$ uses a Gold sequence with a length of 31 bits, and the other uses an m-sequence or a Gold sequence with a length of at least 5 bits.

Optionally, one subsequence uses a Gold sequence with a length of 31 bits, and the sequence may be an existing sequence, or may be a sequence redetermined according to the method in the embodiments of the present invention; and the other subsequence uses a sequence with a length of 7 bits, and the sequence with the length of 7 bits may be generated according to $x_1(n+7)=(x_1(n+1)+) \bmod 2$. In this case, a length of a generated sequence is 38 bits.

Optionally, one subsequence uses a Gold sequence with a length of 31 bits, and the sequence may be an existing sequence, or may be a sequence redetermined according to the method in the embodiments of the present invention; and the other subsequence uses a sequence with a length of 12 bits, and the sequence with the length of 12 bits may be generated according to $x_1(n+12)=(x_1(n+3)+1) \bmod 2$. In this case, a length of a generated sequence is 43 bits.

In another possible embodiment, a longer new sequence may be generated by using three subsequences. For example, a new sequence is generated according to a formula $c(n)=c_1(n \bmod N_1) \cdot c_2(n \bmod N_2) \cdot c_3(n \bmod N_3)$, $0 \leq n \leq N_1 \cdot N_2 \cdot N_3 - 1$, where $c_1$, $c_2$, and $c_3$ are three subsequences, and $N_1$, $N_2$, and $N_3$ are lengths of the three subsequences.

In the solution of this embodiment of the present invention, an initial value of each subsequence may be determined based on one or more transmission parameters. The transmission parameter(s) corresponding to different subsequences may be the same or different. In an implementation, transmission parameters that need to be randomized may be divided into a plurality of groups, and all the groups of transmission parameters are separately mapped to initial values of different subsequences.

(3) A plurality of random sequences are defined. The plurality of random sequences may belong to a same type. For example, all random sequences are Gold sequences. Certainly, some or all of the plurality of random sequences may respectively belong to different types. For example, the plurality of random sequences include a Gold sequence, an m-sequence, and the like.

In the solution of this embodiment of the present invention, different random sequences may be corresponding to different service types or different device types. For example, a first random sequence is used for eMBB, a second random sequence is used for mMTC, and a third random sequence is used for URLLC. For example, a first random sequence is used for a high-capability device, a second random sequence is used for a medium-capability terminal, and the third random sequence is used for a low-capability device.

When to-be-transmitted data is scrambled by using a random sequence or a reference signal is generated by using a random sequence, the random sequence may be determined based on a system parameter and/or a device parameter that are/is associated with the to-be-transmitted data or the to-be-generated reference signal, and then the to-be-transmitted data is scrambled by using the determined random sequence, or the reference signal is generated by using the determined random sequence.

In the solution of this embodiment of the present invention, a to-be-randomized transmission parameter is set on a longer sequence or different subsequences used to generate a sequence, to extend a length of a random sequence, and increase a quantity of transmission parameters that can be randomized or a length of a transmission parameter that can be randomized. In the solution of this embodiment of the present invention, one part of transmission parameters may be used to generate a random sequence, and the other part is carried in control information.

For example, one part of fields of a cell identifier is used to generate a random sequence, and the other part of fields of the cell identifier may be carried in control information.

For another example, one part of fields of an RNTI is used to generate a random sequence, and the other part of fields of the RNTI may be carried in control information.

In the method in this embodiment of the present invention, because the random sequence is generated by using some of the transmission parameters, the generated random sequence may be shorter than a random sequence defined in the prior art. When the generated random sequence is relatively short, an original bit used to carry the random sequence may be used to carry other information. For example, a time domain resource index related to a subcarrier spacing may occupy more bits of the random sequence, to fully indicate or randomize time domain resource index information related to the subcarrier spacing. Corresponding to the foregoing transmission method, the embodiments of the present invention further provide a transmission apparatus configured to perform the foregoing transmission method. The following describes the transmission apparatus in the embodiments of the present invention with reference to schematic diagrams.

Figure 11:
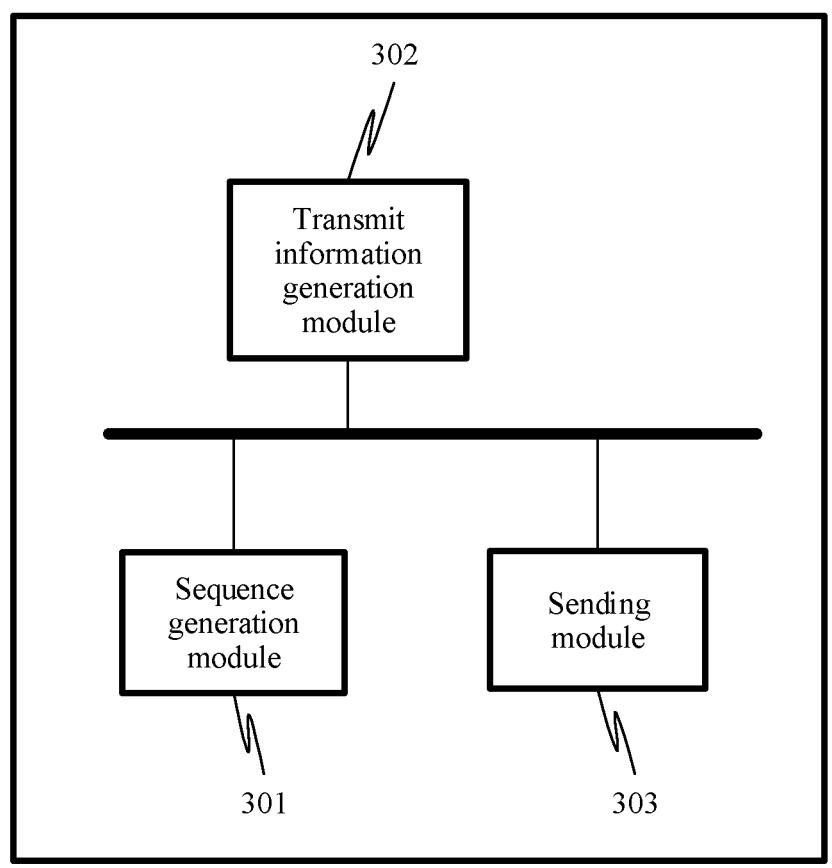
FIG. 11 is a schematic structural diagram of a transmission apparatus according to this application.

FIG. 11 is a schematic structural diagram of a transmission apparatus according to this application. The transmission apparatus shown in FIG. 11 is configured to perform steps performed by the first device in the foregoing method embodiments. As shown in FIG. 11, the apparatus includes a sequence generation module 301, a transmit information generation module 302, and a sending module 303.

The sequence generation module 301 is configured to generate a sequence based on one or more transmission parameters, where the one or more transmission parameters include at least one of the following: a time domain resource type, transmission waveform indication information, subcarrier spacing indication information, device type information, service type indication information, multiple-input multiple-output (MIMO) parameter information, duplex mode indication information, control channel format indication information, and transmission carrier indication information. The transmit information generation module 302 is configured to generate to-be-transmitted information by using the sequence.

The sending module 303 is configured to send the to-be-transmitted information.

In a possible embodiment, that the sequence generation module 301 generates the sequence based on the one or more transmission parameters specifically includes:

determining an initial value of the sequence and/or an initial location of the sequence based on at least one of the one or more transmission parameters, and generating the sequence based on the initial value of the sequence and/or the initial location of the sequence.

In a possible embodiment, the one or more transmission parameters further include a time domain resource index and/or a cell identifier.

In a possible embodiment, the time domain resource index is determined in any one of the following manners:

determining the time domain resource index based on a positive integer indicated by signaling; determining the time domain resource index based on a system message period or a synchronization signal transmission interval; determining the time domain resource index based on a subcarrier spacing; and determining the time domain resource index based on a quantity of slots in a subcarrier spacing used within predefined duration.

In a possible embodiment, that the sequence generation module 301 determines the initial value of the sequence and/or the initial location of the sequence based on the at least one of the one or more transmission parameters specifically includes:

generating the initial value of the sequence by using a first parameter in the one or more transmission parameters, and generating the initial location of the sequence by using a second parameter in the one or more transmission parameters, where the first parameter is different from the second parameter; or respectively determining the initial value of the sequence and the initial location of the sequence based on different bits of a same transmission parameter.

In a possible design, that the transmit information generation module 302 generates the to-be-transmitted information by using the sequence specifically includes:

determining, based on a service type parameter of to-be-transmitted data and/or a capability type of a receiving device, the sequence used to generate the to-be-transmitted information; and generating the to-be-transmitted information by using the determined sequence.

In a possible embodiment, that the sequence generation module 301 generates the sequence based on the one or more transmission parameters specifically includes:

generating a plurality of subsequences based on the one or more transmission parameters, where each subsequence is determined based on all or some of the one or more transmission parameters; and generating the sequence based on the plurality of subsequences, where a length of the sequence is a sum of lengths of the plurality of subsequences.

Figure 12:
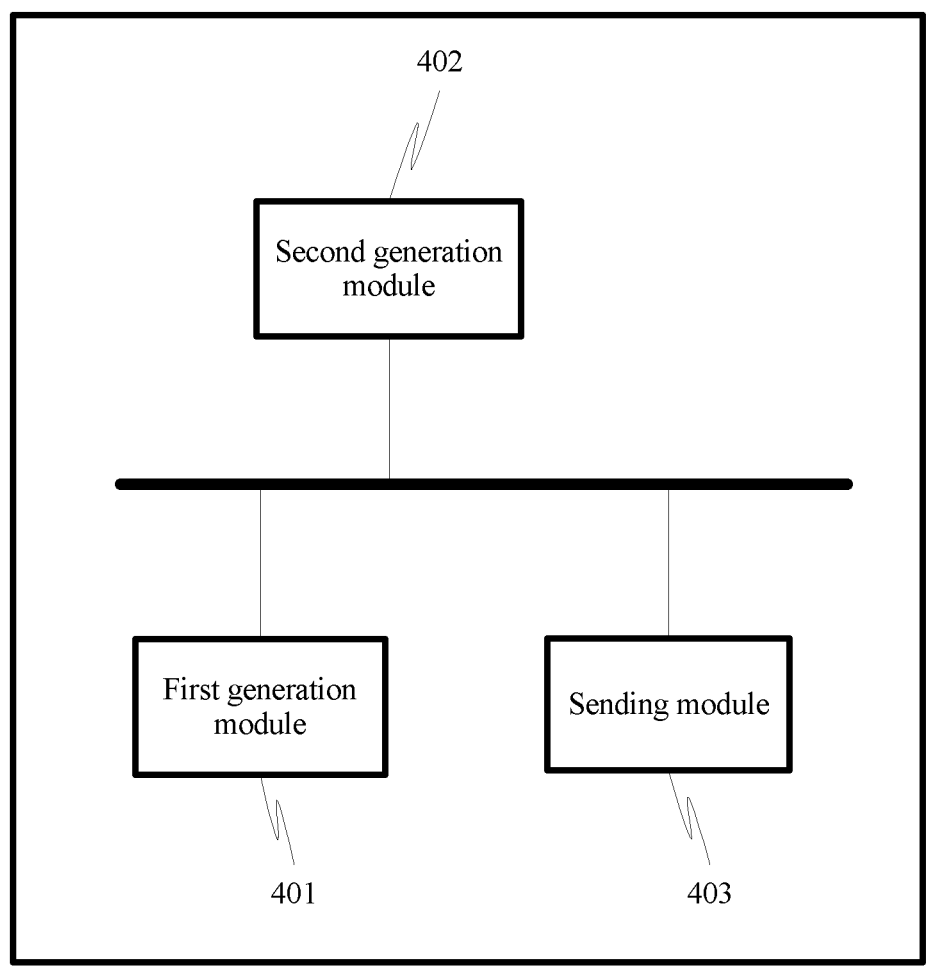
FIG. 12 is a schematic structural diagram of another transmission apparatus according to this application.

In a possible embodiment, that the sequence generation module 301 generates the sequence based on the one or more transmission parameters specifically includes:

generating a plurality of subsequences based on the one or more transmission parameters, where each subsequence is determined based on all or some of the one or more transmission parameters; and correspondingly that the transmit information generation module 302 generates the to-be-transmitted information by using the sequence specifically includes:

scrambling the to-be-transmitted data by using the plurality of subsequences, and/or generating a reference signal by using the plurality of subsequences; or the plurality of subsequences are respectively used on different time domain resources. FIG. 12 is a schematic structural diagram of another transmission apparatus according to this application. The transmission apparatus shown in FIG. 12 is configured to perform steps performed by the first device in the foregoing method embodiments. As shown in FIG. 12, the apparatus includes:

a first generation module 401, configured to determine, based on one or more transmission parameters, an initial location used to generate a sequence, where the one or more transmission parameters are not constants; and a second generation module 402, configured to generate to-be-transmitted information by using the sequence; and a sending module 403, configured to send the to-be-transmitted information.

In a possible embodiment, the one or more transmission parameters include at least one of the following: a time domain resource index, a time domain resource type, transmission waveform indication information, subcarrier spacing indication information, device type information, service type indication information, MIMO parameter information, duplex mode indication information, control channel format indication information, a cell identifier, and transmission carrier indication information.

In a possible embodiment, the first generation module 401 is further configured to determine an initial value of the sequence based on the one or more transmission parameters.

In a possible embodiment, a transmission parameter used to determine the initial value of the sequence is different from a transmission parameter used to determine the initial location of the sequence; or the initial value of the sequence and the initial location of the sequence are respectively determined based on different bits of a same transmission parameter.

In a possible embodiment, the time domain resource index is determined based on a parameter M, where the parameter M is determined in any one of the following manners:

the parameter M is a predefined positive integer; the parameter M is indicated by signaling; the parameter M is determined based on a system message period or a synchronization signal transmission interval; the parameter M is determined based on a subcarrier spacing; or the parameter M is determined based on a quantity of slots in a subcarrier spacing used within predefined duration.

In a possible embodiment, the sequence is determined based on a plurality of subsequences, where each subsequence is determined based on all or some of the one or more transmission parameters, and a length of the sequence is a sum of lengths of the plurality of subsequences.

In a possible embodiment, the sequence includes a plurality of subsequences, where each subsequence is determined based on all or some of the one or more transmission parameters; and correspondingly that a second generation module 402 generates the to-be-transmitted information by using the sequence specifically includes:

scrambling to-be-transmitted data by using the plurality of subsequences, and/or generating a reference signal by using the plurality of subsequences; or the plurality of subsequences are respectively used on different time domain resources.

Figure 13:
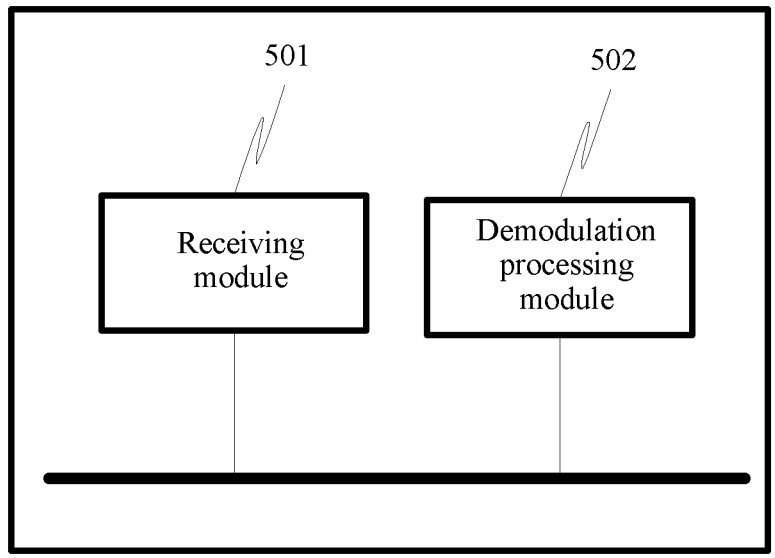
FIG. 13 is a schematic structural diagram of still another transmission apparatus according to this application.

In a possible embodiment, that the second generation module 402 generates the to-be-transmitted information by using the sequence specifically includes:

determining, based on a service type parameter of to-be-transmitted data and/or a capability type of a receiving device, the sequence used to generate the to-be-transmitted information; and generating the to-be-transmitted information by using the determined sequence. FIG. 13 is a schematic structural diagram of still another transmission apparatus according to this application. The transmission apparatus shown in FIG. 13 is configured to perform steps performed by the second device in the foregoing method embodiments. As shown in FIG. 13, the apparatus includes:

a receiving module 501, configured to receive information transmitted by a first device; and a demodulation processing module 502, configured to demodulate the received information by using a sequence, where the sequence is determined based on one or more transmission parameters, and the one or more transmission parameters include at least one of the following: a time domain resource type, transmission waveform indication information, subcarrier spacing indication information, device type information, service type indication information, multiple-input multiple-output (MIMO) parameter information, duplex mode indication information, control channel format indication information, and transmission carrier indication information.

In a possible embodiment, the demodulation processing module 502 is further configured to: determine an initial value of the sequence and/or an initial location of the sequence based on at least one of the one or more transmission parameters, and generate the sequence based on the initial value of the sequence and/or the initial location of the sequence.

In a possible embodiment, the one or more transmission parameters further include a time domain resource index and/or a cell identifier.

In a possible design, the time domain resource index is determined in any one of the following manners:

determining the time domain resource index based on a positive integer indicated by signaling; determining the time domain resource index based on a system message period or a synchronization signal transmission interval; determining the time domain resource index based on a subcarrier spacing; and determining the time domain resource index based on a quantity of slots in a subcarrier spacing used within predefined duration.

In a possible embodiment, that the demodulation processing module 502 determines the initial value of the sequence and/or the initial location of the sequence based on the at least one of the one or more transmission parameters specifically includes:

generating the initial value of the sequence by using a first parameter in the one or more transmission parameters, and generating the initial location of the sequence by using a second parameter in the one or more transmission parameters, where the first parameter is different from the second parameter; or respectively determining the initial value of the sequence and the initial location of the sequence based on different bits of a same transmission parameter.

In a possible embodiment, that the demodulation processing module 502 demodulates the received information by using the sequence specifically includes:

determining, based on a service type parameter of transmitted data and/or a capability type of a receiving device, the sequence used to demodulate the received information; and demodulating the received information by using the determined sequence.

In a possible embodiment, that the sequence is determined based on one or more transmission parameters includes that the sequence is determined based on a plurality of subsequences, where each subsequence is determined based on all or some of the one or more transmission parameters, and a length of the sequence is a sum of lengths of the plurality of subsequences.

In a possible embodiment, that the sequence is determined based on one or more transmission parameters includes that the sequence includes a plurality of subsequences, where each subsequence is determined based on all or some of the one or more transmission parameters; and that the demodulation processing module 502 demodulates the received information by using the sequence specifically includes:

demodulating the received information by using the plurality of subsequences; or the plurality of subsequences are respectively used on different time domain resources.

Figure 14:
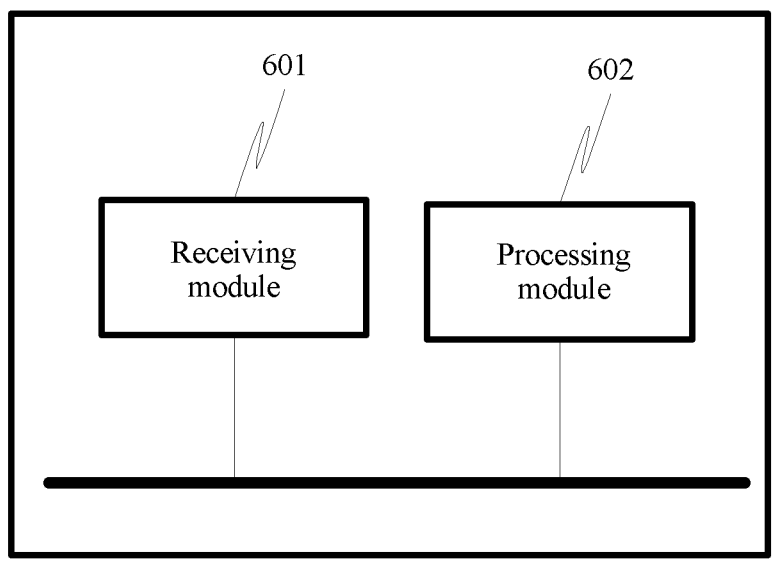
FIG. 14 is a schematic structural diagram of yet another transmission apparatus according to this application.

FIG. 14 is a schematic structural diagram of yet another transmission apparatus according to this application. The transmission apparatus shown in FIG. 14 is configured to perform steps performed by the second transmission apparatus in the foregoing method embodiments. As shown in FIG. 14, the apparatus includes:

a receiving module 601, configured to receive information transmitted by a first device; and a processing module 602, configured to demodulate the received information by using a sequence, where an initial location of the sequence is determined based on one or more transmission parameters, and the one or more transmission parameters are not constants.

In a possible embodiment, the one or more transmission parameters include at least one of the following: a time domain resource index, a time domain resource type, transmission waveform indication information, subcarrier spacing indication information, device type information, service type indication information, MIMO parameter information, duplex mode indication information, control channel format indication information, a cell identifier, and transmission carrier indication information.

In a possible embodiment, the initial location of the sequence is determined based on the one or more transmission parameters.

In a possible embodiment, a transmission parameter used to determine the initial value of the sequence is different from a transmission parameter used to determine the initial location of the sequence; or the initial value of the sequence and the initial location of the sequence are respectively determined based on different bits of a same transmission parameter.

In a possible embodiment, the time domain resource index is determined based on a parameter M, where the parameter M is determined in any one of the following manners:

the parameter M is a predefined positive integer; the parameter is indicated by signaling; the parameter M is determined based on a system message period or a synchronization signal transmission interval; the parameter M is determined based on a subcarrier spacing; and the parameter M is determined based on a quantity of slots in a subcarrier spacing used within predefined duration.

In a possible embodiment, the sequence is determined based on a plurality of subsequences, where each subsequence is determined based on all or some of the one or more transmission parameters, and a length of the sequence is a sum of lengths of the plurality of subsequences.

In a possible embodiment, the sequence includes a plurality of subsequences, where each subsequence is determined based on all or some of the one or more transmission parameters; and correspondingly that the processing module 602 demodulates the received information by using the sequence specifically includes:

demodulating the received information by using the plurality of subsequences; or the plurality of subsequences are respectively used on different time domain resources.

Figure 15:
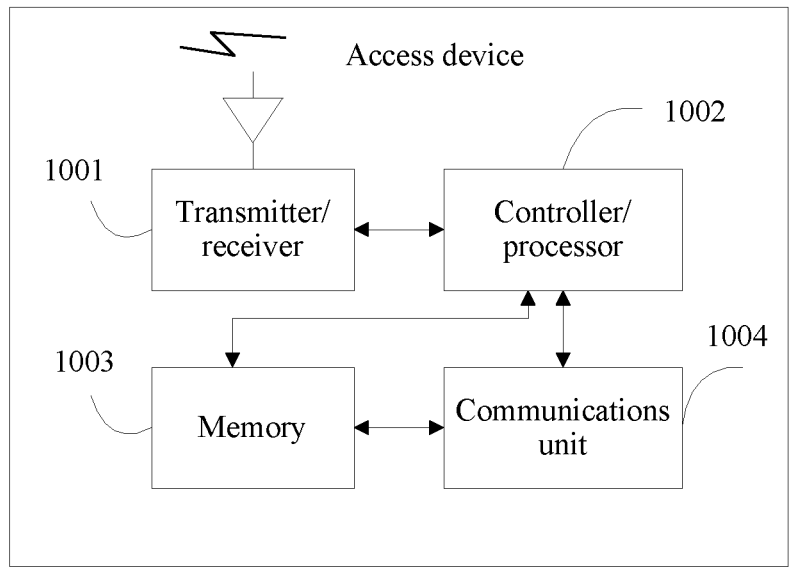
FIG. 15 is a schematic structural diagram of an access device according to this application.

In a possible embodiment, that the processing module 602 demodulates the received information by using the sequence specifically includes:

determining, based on a service type parameter of transmitted data and/or a capability type of a receiving device, the sequence used to demodulate the received information; and demodulating the received information by using the determined sequence. In a solution of the embodiments of the present invention, the transmission apparatuses in FIG. 11 to FIG. 14 may be access devices. FIG. 15 is a possible schematic structural diagram of the access device in the foregoing embodiments. As shown in FIG. 15, the access device includes a transmitter/receiver 1001, a controller/processor 1002, a memory 1003, and a communications unit 1004. The transmitter/receiver 1001 is configured to: support receiving and sending information between the access device and the terminal device in the foregoing embodiments, and support radio communication between the terminal device and another terminal device. The controller/processor 1002 performs various functions for communicating with the terminal device. In an uplink, an uplink signal from the terminal device is received by using an antenna, is demodulated by the receiver 1001, and is further processed by the controller/processor 1002 to restore service data and signaling information that are sent by the terminal device. In a downlink, service data and a signaling message are processed by the controller/processor 1002 and are demodulated by the transmitter 1001 to generate a downlink signal, and the downlink signal is transmitted to the terminal device by using the antenna. The controller/processor 1002 further performs the data transmission method performed by the first device or the second device in the solutions of the embodiments of the present invention. The memory 1003 is configured to store program code and data of the access device. The communications unit 1004 is configured to support the access device in communicating with another network entity.

Optionally, when the access device shown in FIG. 15 is used as the transmission apparatus shown in FIG. 11 to perform the transmission method in the embodiments of the present invention, the controller/processor 1002 in FIG. 15 implements, independently or in cooperation with the memory 1003, functions implemented by the sequence generation module 301 and the transmit information generation module 302 in FIG. 11, and the transmitter/receiver 1001 is configured to implement a function implemented by the sending module 303 in FIG. 11.

Optionally, when the access device shown in FIG. 15 is used as the transmission apparatus shown in FIG. 12 to perform the transmission method in the embodiments of the present invention, the controller/processor 1002 in FIG. 15 implements, independently or in cooperation with the memory 1003, functions implemented by the first generation module 401 and the second generation module 402 in FIG. 12, and the transmitter/receiver 1001 is configured to implement a function implemented by the sending module 403 in FIG. 12.

Optionally, when the access device shown in FIG. 15 is used as the transmission apparatus shown in FIG. 13 to perform the transmission method in the embodiments of the present invention, the controller/processor 1002 in FIG. 15 implements, independently or in cooperation with the memory 1003, a function implemented by the demodulation processing module 502 in FIG. 13, and the transmitter/receiver 1001 is configured to implement a function implemented by the receiving module 501 in FIG. 13.

Optionally, when the access device shown in FIG. 15 is used as the transmission apparatus shown in FIG. 14 to perform the transmission method in the embodiments of the present invention, the controller/processor 1002 in FIG. 15 implements, independently or in cooperation with the memory 1003, a function implemented by the processing module 602 in FIG. 14, and the transmitter/receiver 1001 is configured to implement a function implemented by the receiving module 601 in FIG. 14.

It may be understood that FIG. 15 shows merely a simplified embodiment of the access device. In actual application, the access device may include any quantity of transmitters, receivers, processors, controllers, memories, communications units, and the like, and access devices that can implement the present invention fall within the protection scope of the present invention.

Figure 16:
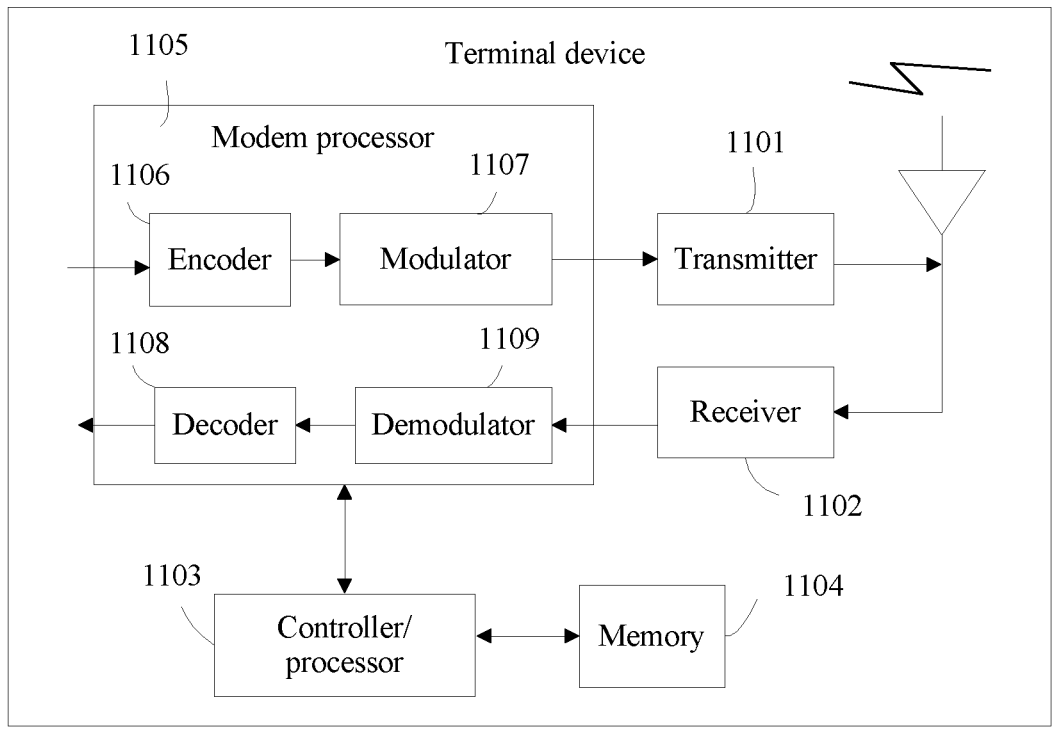
FIG. 16 is a schematic structural diagram of a terminal device according to this application.

In a solution of the embodiments of the present invention, the transmission apparatuses in FIG. 11 to FIG. 14 may be terminal devices. FIG. 16 is a schematic diagram of a simplified possible embodiment structure of the terminal device in the foregoing embodiments. The terminal device includes a transmitter 1101, a receiver 1102, a controller/processor 1103, a memory 1104, and a modem processor 1105.

The transmitter 1101 adjusts (for example, performs analog conversion, filtering, amplification, and up-conversion) output sample and generates an uplink signal. The uplink signal is transmitted to the access device in the foregoing embodiments by using an antenna. In a downlink, the antenna receives a downlink signal transmitted by the access device in the foregoing embodiments. The receiver 1102 adjusts (for example, performs filtering, amplification, down-conversion, and digitization) a signal received from the antenna, and provides an input sample. In the modem processor 1105, an encoder 1106 receives service data and a signaling message that are to be sent in an uplink, and processes (for example, performs formatting, encoding, and interleaving) the service data and the signaling message. A modulator 1107 further processes (for example, performs symbol mapping and modulation) encoded service data and an encoded signaling message, and provides an output sample. A demodulator 1109 processes (for example, demodulates) the input sample, and provides a symbol estimate. A decoder 1108 processes (for example, performs de-interleaving and decoding) the symbol estimate, and provides decoded data and a decoded signaling message that are to be sent to the terminal device. The encoder 1106, the modulator 1107, the demodulator 1109, and the decoder 1108 may be implemented by the composite modem processor 1105. These units perform processing based on a radio access technology (for example, access technologies in LTE and other evolved systems) used in a radio access network.

The controller/processor 1103 controls and manages an action of the terminal device, and is configured to perform the data transmission method performed by the first device or the second device in the embodiments of the present invention. The memory 1104 is configured to store program code and data that are used by the terminal device.

Optionally, when the terminal device shown in FIG. 16 is used as the transmission apparatus shown in FIG. 11 to perform the transmission method in the embodiments of the present invention, the controller/processor 1103 in FIG. 16 implements, independently or in cooperation with the memory 1104, functions implemented by a sequence generation module 301 and a transmit information generation module 302 in FIG. 11, and the transmitter 1101 is configured to implement a function implemented by the sending module 303 in FIG. 11.

Optionally, when the terminal device shown in FIG. 16 is used as the transmission apparatus shown in FIG. 12 to perform the transmission method in the embodiments of the present invention, the controller/processor 1103 in FIG. 16 implements, independently or in cooperation with the memory 1003, functions implemented by the first generation module 401 and the second generation module 402 in FIG. 12, and the transmitter 1101 is configured to implement a function implemented by the sending module 403 in FIG. 12.

Optionally, when the terminal device shown in FIG. 16 is used as the transmission apparatus shown in FIG. 13 to perform the transmission method in the embodiments of the present invention, the controller/processor 1103 in FIG. 16 implements, independently or in cooperation with the memory 1003, a function implemented by the demodulation processing module 502 in FIG. 13, and the receiver 1102 is configured to implement a function implemented by the receiving module 501 in FIG. 13.

Optionally, when the terminal device shown in FIG. 16 is used as the transmission apparatus shown in FIG. 14 to perform the transmission method in the embodiments of the present invention, the controller/processor 1103 in FIG. 16 implements, independently or in cooperation with the memory 1003, a function implemented by the processing module 602 in FIG. 14, and the receiver 1102 is configured to implement a function implemented by the receiving module 601 in FIG. 14.

The controller/processor configured to perform a function of the foregoing access device or terminal device in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to the content disclosed in the present invention. Alternatively, the processor may be a combination implementing a computing function, for example, a combination including one or more microprocessors, or a combination of a DSP and a microprocessor.

Method or algorithm steps described with reference to the content disclosed in the present invention may be implemented by hardware, or may be implemented by the processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium in any other forms well-known in the art. An example storage medium is coupled to the processor, so that the processor can read information from the storage medium and can write information into the storage medium. Certainly, the storage medium may be a component of the processor. The processor and the storage medium may be located in an ASIC. In addition, the ASIC may be located in the terminal device. Certainly, the processor and the storage medium may exist in the terminal device as discrete assemblies.

A person skilled in the art should be aware that in the foregoing one or more examples, the functions described in the present invention may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another place. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely the specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method for wireless communication, comprising:
receiving data from an access device; and
descrambling the data based on a first sequence, wherein the first sequence is a portion of a target sequence and the first sequence starts from a location in the target sequence, wherein the first sequence is represented as $c(n)$, the target sequence is represented as $c_1(n1)$ and is determined based on an initial value of $c_1(n1)$, and the first sequence and the target sequence satisfy: $c(n)=c_1(n+x)$, wherein x is the location in the target sequence and is determined based on an index of a beam, n and n1 are integers, $0 \leq n \leq M-1$, M is a length of the first sequence, and $n1 \geq 0$.

2. The method according to claim 1, further comprising:
obtaining the first sequence according to the location and the initial value, and the initial value is associated with a cell identifier.

3. The method according to claim 2, wherein the initial value is an initialized value of a shift register for generating the target sequence.

4. The method according to claim 1, further comprising:
obtaining the first sequence from the target sequence according to the location.

5. The method according to claim 4, wherein the target sequence is a Gold sequence.

6. The method according to claim 1, wherein the target sequence is associated with a cell identifier and a time domain resource index.

7. The method according to claim 6, wherein the time domain resource index comprises a first part associated with the first sequence, and a second part carried in a physical broadcast channel (PBCH).

8. The method according to claim 7, further comprising:
receiving a signal that comprises the second part of the time domain resource index and a synchronization signal.

9. The method according to claim 1, wherein the index of the beam comprises a first part associated with the first sequence, and a second part carried in a physical broadcast channel (PBCH).

10. The method according to claim 9, further comprising:
receiving a signal that comprises the second part of the index of the beam and a synchronization signal.

11. The method according to claim 1, wherein receiving the data from the access device is receiving the data in a PBCH from the access device.

12. A communication apparatus, comprising:
a receiver, configured to receive data from an access device; and at least one processor, configured to descramble the data based on a first sequence, wherein the first sequence is a portion of a target sequence and the first sequence starts from a location in the target sequence, wherein the first sequence is represented as c(n), the target sequence is represented as $c_1(n1)$ and is determined based on an initial value of $c_1(n1)$, and the first sequence and the target sequence satisfy: $c(n)=c_1(n+x)$, wherein x is the location in the target sequence and is determined based on an index of a beam, n and n1 are integers, $0 \leq n \leq M-1$, M is a length of the first sequence, and $n1 \geq 0$.

13. The apparatus according to claim 12, wherein the processor is further configured to:
obtain the first sequence according to the location and the initial value, wherein the initial value is associated with a cell identifier.

14. The apparatus according to claim 13, wherein the initial value is an initialized value of a shift register for generating the target sequence.

15. The apparatus according to claim 12, wherein the processor is further configured to:
obtain the first sequence from the target sequence according to the location.

16. The apparatus according to claim 15, wherein the target sequence is a Gold sequence.

17. The apparatus according to claim 12, wherein the target sequence is associated with a cell identifier and a time domain resource index.

18. The apparatus according to claim 17, wherein the time domain resource index comprises a first part associated with the first sequence, and a second part carried in a physical broadcast channel (PBCH).

19. The apparatus according to claim 18, wherein the receiver is further configured to:
receive a signal that comprises the second part of the time domain resource index and a synchronization signal.

20. The apparatus according to claim 12, wherein the index of the beam comprises a first part associated with the first sequence, and a second part carried in a physical broadcast channel (PBCH).

21. The apparatus according to claim 20, wherein the receiver is further configured to:
receive a signal that comprises the second part of the index of the beam and a synchronization signal.

22. The apparatus according to claim 12, wherein the receiver is configured to receive the data in a PBCH from the access device.

23. A non-transitory computer readable medium, comprising computer program instructions which when executed by one or more processors cause the one or more processors to:
receive data from an access device; and
descramble the data based on a first sequence, wherein the first sequence is a portion of a target sequence and the first sequence starts from a location in the target sequence, wherein the first sequence is represented as c(n), the target sequence is represented as $c_1(n1)$ and is determined based on an initial value of $c_1(n1)$, and the first sequence and the target sequence satisfy: $c(n)=c_1(n+x)$, wherein x is the location in the target sequence and is determined based on an index of a beam, n and n1 are integers, $0 \leq n \leq M-1$, M is a length of the first sequence, and $n \geq 0$.

24. The non-transitory computer readable medium according to claim 23, wherein the one or more processors further:
obtain the first sequence according to the location and the initial value, wherein the initial value is associated with a cell identifier.

25. The non-transitory computer readable medium according to claim 23, wherein the one or more processors further execute the step of:
obtaining the first sequence from the target sequence according to the location.

26. The non-transitory computer readable medium according to claim 23, wherein the index of the beam comprises a first part associated with the first sequence, and a second part carried in a physical broadcast channel (PBCH).

27. The non-transitory computer readable medium according to claim 23, wherein a time domain resource index comprises a first part associated with the first sequence, and a second part carried in a physical broadcast channel (PBCH).

* * * * *